(12) United States Patent
Lin

(10) Patent No.: US 9,996,948 B2
(45) Date of Patent: Jun. 12, 2018

(54) IMAGE DOWNSAMPLING APPARATUS AND METHOD

(71) Applicant: Novatek Microelectronics Corp., Hsinchu (TW)

(72) Inventor: Hsin-I Lin, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 475 days.

(21) Appl. No.: 14/477,878

(22) Filed: Sep. 5, 2014

(65) Prior Publication Data

US 2015/0254815 A1 Sep. 10, 2015

(30) Foreign Application Priority Data

Mar. 7, 2014 (TW) .............................. 103107953 A

(51) Int. Cl.
*G06T 3/00* (2006.01)
*G06T 11/00* (2006.01)
*G06T 11/20* (2006.01)
*G06T 3/40* (2006.01)

(52) U.S. Cl.
CPC .............. *G06T 11/001* (2013.01); *G06T 3/40* (2013.01); *G06T 11/203* (2013.01)

(58) Field of Classification Search
CPC ..... H04N 7/0117–7/0122; G06T 3/40–3/4092; G06T 11/001; G06T 11/203
See application file for complete search history.

(56) References Cited

U.S. PATENT DOCUMENTS

| 6,876,386 | B1 | 4/2005 | Ito | |
|---|---|---|---|---|
| 2002/0012183 | A1* | 1/2002 | Kovvuri | G09G 5/00 359/896 |
| 2002/0110197 | A1* | 8/2002 | Pearlstein | H04N 19/51 375/240.27 |
| 2004/0165081 | A1* | 8/2004 | Shibaki | H04N 1/6072 348/222.1 |
| 2006/0023943 | A1* | 2/2006 | Makino | H04N 1/6072 382/167 |
| 2007/0008195 | A1* | 1/2007 | Jin | H03M 1/1255 341/61 |

(Continued)

OTHER PUBLICATIONS

"Office Action of Taiwan Counterpart Application," dated Dec. 24, 2015, p. 1-p. 4, in which the listed references were cited.

(Continued)

*Primary Examiner* — Sean Motsinger
(74) *Attorney, Agent, or Firm* — JCIPRNET

(57) ABSTRACT

An image downsampling apparatus and an image downsampling method are provided. The image downsampling apparatus includes a one-directional downsampling circuit, a multi-directional downsampling circuit and an output circuit. The one-directional downsampling performs one-directional downsampling by using an original image signal to obtain and output a first adjusted image signal. The multi-directional downsampling circuit performs multi-directional downsampling by using the original image signal to obtain and output a second adjusted image signal. The output circuit outputs a downsampled image signal according to the first adjusted image signal and the second adjusted image signal.

51 Claims, 21 Drawing Sheets

400

(56) References Cited

U.S. PATENT DOCUMENTS

| | | | | |
|---|---|---|---|---|
| 2009/0214108 A1* | 8/2009 | Yen | ............................ | G06K 9/38 382/163 |
| 2009/0220120 A1* | 9/2009 | Yen | ..................... | G06K 9/00664 382/100 |
| 2010/0117934 A1* | 5/2010 | Harris | ..................... | G09G 3/001 345/56 |
| 2010/0135588 A1* | 6/2010 | Au | ........................... | G06T 3/403 382/243 |
| 2010/0289816 A1* | 11/2010 | Au | ........................... | G09G 5/026 345/613 |
| 2010/0303384 A1* | 12/2010 | Knee | ...................... | G06T 3/4023 382/298 |
| 2011/0222770 A1* | 9/2011 | Au | ........................... | G06T 3/4023 382/173 |
| 2011/0254847 A1* | 10/2011 | Au | ........................... | G06T 3/4023 345/428 |
| 2012/0105926 A1* | 5/2012 | Ishikawa | ............. | H04N 1/00013 358/505 |
| 2013/0141536 A1* | 6/2013 | Choe | ................... | H04N 5/44591 348/43 |
| 2015/0178962 A1* | 6/2015 | Genda | ..................... | H04N 1/393 345/443 |
| 2015/0254815 A1* | 9/2015 | Lin | ......................... | G06T 11/001 382/299 |
| 2016/0005158 A1* | 1/2016 | Asano | ..................... | H04N 5/349 382/154 |
| 2016/0269711 A1* | 9/2016 | Hwang | ............... | H04N 13/0059 |
| 2016/0324505 A1* | 11/2016 | Maeda | ................. | A61B 8/0858 |

OTHER PUBLICATIONS

"Luma (video) , " downloaded from Wikipedia on Aug. 28, 2014, availabe at: http://en.wikipedia.org/wiki/Luma_(video), pp. 1-pp. 4.
Nikolai Waldman, "Math behind colorspace colorspace conversions, RGB-HSL," May 8, 2013, available at: http://www.niwa.nu/2013/05/math-behind-colorspace-conversions-rgb-hsl/, pp. 1-pp. 9.
"HSV: Hue Saturation Value." downloaded on Aug. 28, 2014, available at: http://www5.informatik.tu-muenchen.de/lehre/vorlesungen/graphik/info/csc/COL_25.htm, pp. 1-pp. 2.
"Kirsch operator," downloaded from Wikipedia on Aug. 28, 2014, available at: http://en.wikipedia.org/wiki/Kirsch_operator, pp. 1-pp. 2.
"Sobel Operator," downloaded from Wikipedia on Aug. 28, 2014, available at: http://en.wikipedia.org/wiki/Sobel_operator, pp. 1-pp. 6.
"Prewitt operator, " downloaded on Aug. 28, 2014, available at: http://en.wikipedia.org/wiki/Prewitt_operator, pp. 1-pp. 2.
Fisher et al., "Laplacian/Laplacian of Gaussian," 2003, available at: http://homepages.inf.ed.ac.uk/rbf/HIPR2/log.htm, pp. 1-pp. 8.
Marr et al., "Theory of Edge Detection," Proceedings of the Royal Society of London. Series B, Biological Sciences, Feb. 29, 1980, pp. 187-pp. 217.
"Canny edge detector," downloaded from Wikipedia on Aug. 28, 2014, available at: http://en.wikipedia.org/wiki/Canny_edge_detector, pp. 1-pp. 6.

* cited by examiner

IMAGE DOWNSAMPLING APPARATUS AND METHOD

CROSS-REFERENCE TO RELATED APPLICATION

This application claims the priority benefit of Taiwan application serial no. 103107953, filed on Mar. 7, 2014. The entirety of the above-mentioned patent application is hereby incorporated by reference herein and made a part of this specification.

FIELD OF THE INVENTION

The disclosure is directed to an image processing apparatus and a method thereof. More particularly, the disclosure is directed to an image downsampling apparatus and a method thereof.

DESCRIPTION OF RELATED ART

During a process of image processing, an image processing apparatus commonly has to perform image downsampling on an image frame to adjust a resolution of the image frame. The conventional image downsampling technique may have issues of line-broken and color fringing artifact, or alternatively, loss of sharpness or even blur in the image frame.

SUMMARY

The invention provides an image downsampling apparatus and an image downsampling method for mitigating the issues of line-broken and color fringing artifact and reducing the sharpness loss.

According to an embodiment of the invention, an image downsampling apparatus including a one-dimensional downsampling circuit, a multi-dimensional downsampling circuit and an output circuit is provided. The one-directional downsampling circuit performs one-directional downsampling by using an original image signal to obtain and output a first adjusted image signal, where a resolution of the first adjusted image signal is less than a resolution of the original image signal. The multi-directional downsampling circuit performs multi-directional downsampling by using the original image signal to obtain and output a second adjusted image signal, where a resolution of the second adjusted image signal is less than the resolution of the original image signal. The output circuit is coupled to an output terminal of the one-directional downsampling circuit and an output terminal of the multi-directional downsampling circuit. The output circuit outputs a downsampled image signal according to the first adjusted image signal and the second adjusted image signal.

According to an embodiment of the invention, an image downsampling method including the following steps is provided. One-direction downsampling is performed by using the original image signal to obtain a first adjusted image signal, where a resolution of the first adjusted image signal is less than a resolution of the original image signal. Multi-direction downsampling is performed by using the original image signal to obtain and output a second adjusted image signal, where a resolution of the second adjusted image signal is less than the resolution of the original image signal. And, a downsampled image signal is obtained according to the first adjusted image signal and the second adjusted image signal.

According to an embodiment of the invention, an image downsampling apparatus including a colorless detector and a downsampling circuit is provided. The colorless detector performs colorless detection by using an original image signal to obtain and output a detection result. The downsampling circuit receives the original image signal and performs downsampling by using the original image signal to obtain and output a downsampled image signal, where a resolution of the downsampled image signal is less than a resolution of the original image signal. When the detection result is a first logic value, the downsampling circuit performs one-directional downsampling according to red-color data $R_{(a*i,a*j)}$, green-color data $G_{(a*i,a*j)}$ and blue-color data $B_{(a*i,a*j)}$ of a corresponding pixel in the original image signal to obtain red-color subpixel data, green-color subpixel data and blue-color subpixel data located in a pixel coordinate (i,j) in the downsampled image signal, where a is a positive integer. When the detection result is a second logic value, the downsampling circuit selects red-color data of a first corresponding pixel, green-color data of a second corresponding pixel and blue-color data of a third corresponding pixel from the original image signal in a sampling direction to perform the downsampling to obtain red-color subpixel data, green-color subpixel data and blue-color subpixel data located in the pixel coordinate (i,j) in the downsampled image signal. One of the first corresponding pixel, the second corresponding pixel and the third corresponding pixel has a pixel coordinate (a*i,a*j) in the original image signal.

According to an embodiment of the invention, an image downsampling method is provided, which includes the following steps. Colorless detection is performed by using an original image signal to obtain a detection result. Downsampling is performed by using the original image signal to obtain an adjusted image signal, where a resolution of the downsampled image signal is less than a resolution of the original image signal. When the detection result is a first logic value, the downsampling is performed according to red-color data $R_{(a*i,a*j)}$, green-color data $G_{(a*i,a*j)}$ and blue-color data $B_{(a*i,a*j)}$ of a corresponding pixel in the original image signal to obtain red-color subpixel data, green-color subpixel data and blue-color subpixel data located in a pixel coordinate (i,j) in the downsampled image signal, where a is a positive integer. When the detection result is a second logic value, red-color data of a first corresponding pixel, green-color data of a second corresponding pixel and blue-color data of a third corresponding pixel are selected from the original image signal in a sampling direction to perform the downsampling to obtain red-color subpixel data, green-color subpixel data and blue-color subpixel data located in a pixel coordinate (i,j) in the downsampled image signal. One of the first corresponding pixel, the second corresponding pixel and the third corresponding pixel has a pixel coordinate (a*i,a*j) in the original image signal.

To sum up, in some embodiments of the invention, the downsampled image signal is obtained by using the first adjusted image signal obtained by the one-directional downsampling and/or the second adjusted image signal obtained by the multi-directional downsampling. In some other embodiments of the invention, the selection of the subpixels during the downsampling process is determined/changed by performing the colorless detection on the original image signal and according to the detection result. Thereby, the image downsampling apparatus and the image downsampling method of the embodiments of the invention can contribute to mitigating the issues of line-broken and color fringing artifact and reducing the sharpness loss.

In order to make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
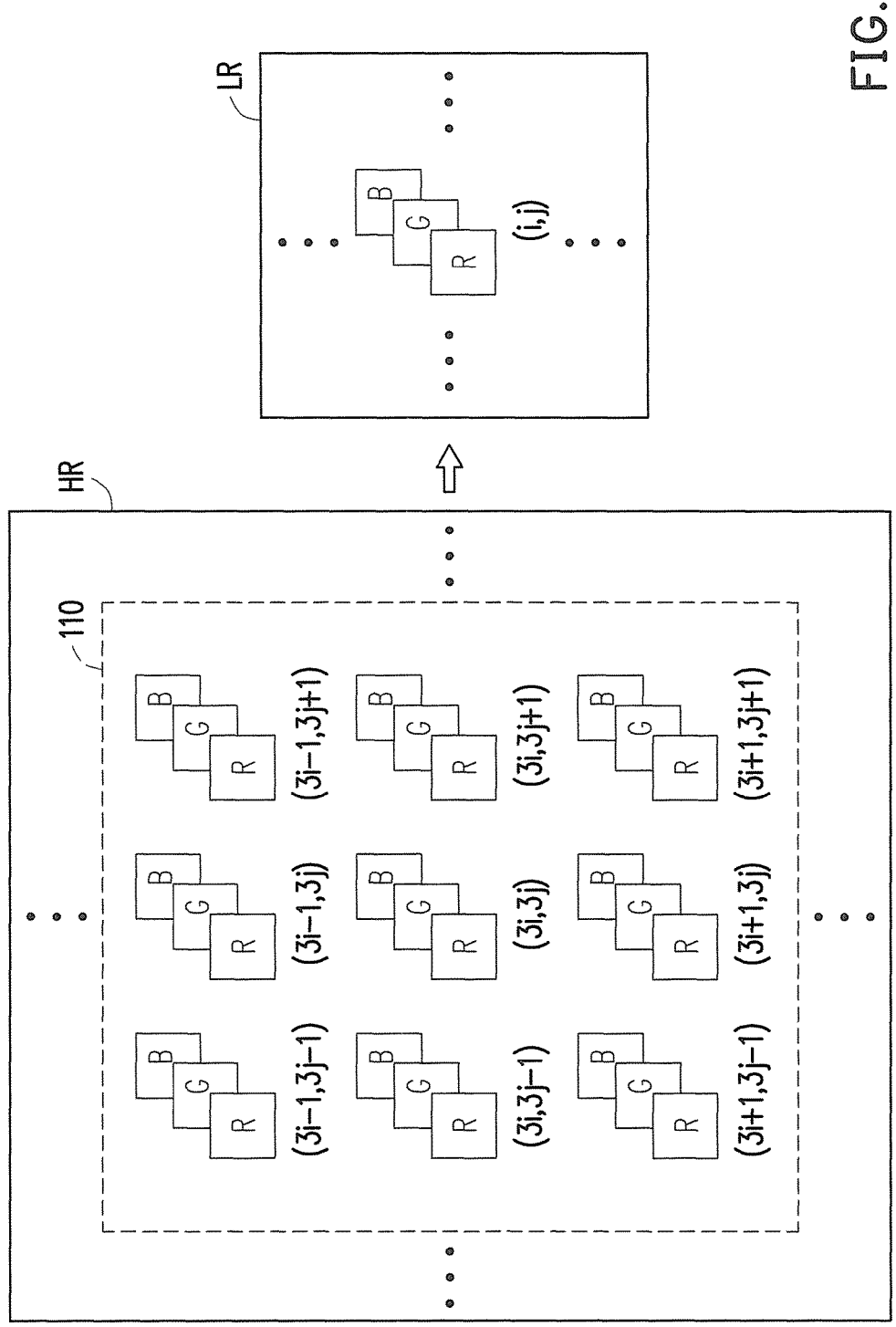
FIG. 1 is a schematic diagram of image downsampling according to an embodiment of the invention.

The term "coupled" herein (including the claims) are used broadly and encompass direct and indirect connection or coupling means. For example, if the disclosure describes a first apparatus being coupled to a second apparatus, then the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

FIG. 1 is a schematic diagram of image downsampling according to an embodiment of the invention. In FIG. 1, R, G and B respectively represent different subpixels in the same pixel, such as a red-color subpixel, a green-color pixel and a blue-color subpixel. An original image signal HR may be downsampled so as to obtain a downsampled image signal LR. That is, a resolution of the original image signal HR is greater than a resolution of the downsampled image signal LR. One image frame of the original image signal HR may be divided into a plurality of pixel groups. Each pixel group in the original image signal HR may be downsampled as a pixel in the downsampled image signal LR. For example, a pixel group 110 in the original image signal HR may be downsampled as a pixel located in a pixel coordinate (i,j) in the downsampled image signal LR, where i and j are integers.

A length ratio (or a width ratio) of the original image signal HR to the downsampled image signal LR may be determined based on design requirements. Taking the embodiment illustrated in FIG. 1 as an example, the length ratio (or the width ratio) of the original image signal HR to the downsampled image signal LR is 3:1. Thus, in the original image signal HR illustrated in FIG. 1, 3*3 pixels (respectively having coordinates (3i−1,3j−1), (3i−1,3j), (3i−1,3j+1), (3i,3j−1), (3i,3j), (3i,3j+1), (3i+1,3j−1), (3i+1,3j) and (3i+1,3j+1)) may be grouped into the pixel group 110. Nevertheless, in other embodiments, the length ratio (or the width ratio) of the original image signal HR to the downsampled image signal LR should not be limited to the embodiment illustrated in FIG. 1.

Figure 2:
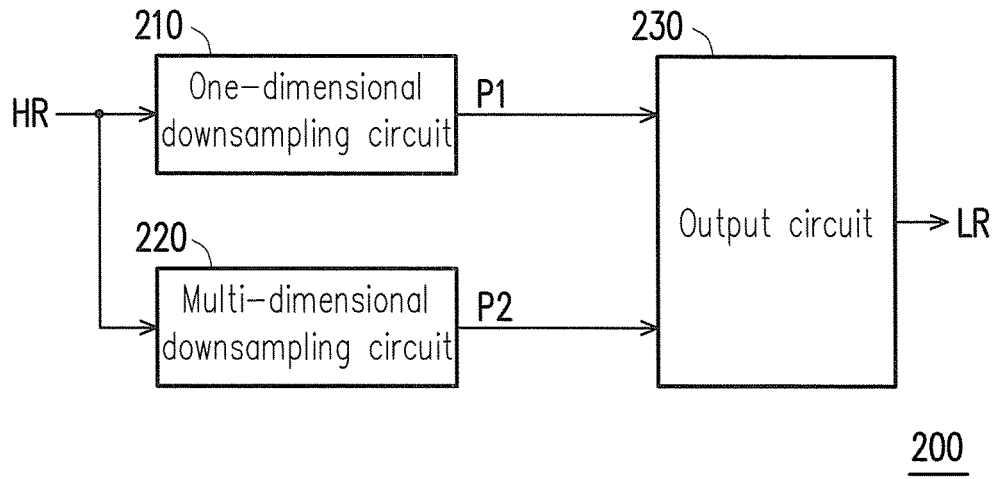
FIG. 2 is a schematic diagram of an image downsampling apparatus according to an embodiment of the invention.

FIG. 2 is a schematic diagram of an image downsampling apparatus 200 according to an embodiment of the invention. The image downsampling apparatus 200 includes a one-dimensional (or 1D) downsampling circuit 210, a multi-dimensional downsampling circuit 220 and an output circuit 230. The image downsampling apparatus 200 serves to perform an image downsampling method as follows. The one-directional downsampling circuit 210 receives the original image signal HR and performs one-directional downsampling by using the original image signal HR to obtain and output a first adjusted image signal P1, where a resolution of the first adjusted image signal P1 is less than a resolution of the original image signal HR (which can be inferred according to the description with respect to FIG. 1). For example, in some embodiments (but not limited to), the one-directional downsampling performed by the one-directional downsampling circuit 210 may include the following operations. The one-directional downsampling circuit 210 selects one corresponding subpixel data from a plurality of subpixel data of the original image signal HR. After the corresponding subpixel data is selected, the one-directional downsampling circuit 210 calculates a formula, $$P1_{(i,j)} = \sum_{k=-q}^{q} c_k HR_k,$$

to perform a one-directional filter operation. $P1_{(i,j)}$ represents subpixel data located in the pixel coordinate (i,j) in the first adjusted image signal P1, and q represents a filter range value and is an integer. In a filter range $HR_{-q}$ to $HR_q$, $HR_0$ represents the corresponding subpixel data in the original image signal HR, $HR_{-q}$ to $HR_{-1}$ and $HR_1$ to $HR_q$ represent a plurality of subpixel data adjacent to the corresponding subpixel data $HR_0$ in the original image signal HR in one direction, and $c_k$ represents a filter value corresponding to subpixel data $HR_k$ in the original image signal HR, where $0 \leq c_k \leq 1$, and the filter value $c_k$ may be determined based on design requirements.

The aforementioned direction which is used to define the adjacent pixel data and the filter range value q may be determined based on design requirements. For example, if it is assumed that the direction is a 0-degree direction (a horizontal direction, a column direction or a row direction), and the filter range value q is 2, referring to FIG. 1 and FIG. 2, after a green-color subpixel $G_{(3i,3j)}$ located in the pixel coordinate (3i,3j) in the original image signal HR is selected as the corresponding subpixel data $HR_0$, the one-directional downsampling circuit 210 may calculate $$g_{1d(i,j)} = \sum_{k=-2}^{2} c_k G_{(3i,3j+k)},$$

where $g_{1d(i,j)}$ represents green-color subpixel data (which is equivalent to $P1_{(i,j)}$) located in the pixel coordinate (i,j) in the first adjusted image signal P1, and $G_{(3i,3j+k)}$ represents the corresponding subpixel data $G_{(3i,3j)}$ and the adjacent subpixel data (which is equivalent to $HR_k$) in the horizontal direction. In another embodiment, after a blue-color subpixel $B_{(3i-1,3j+1)}$ located in the pixel coordinate (3i−1,3j+1) in the original image signal HR is selected as the corresponding subpixel data $HR_0$, the one-directional downsampling circuit 210 may calculate $$b_{1d(i,j)} = \sum_{k=-2}^{2} c_k B_{(3i-1,3j+1+k)},$$

where $b_{1d(i,j)}$ represents blue-color subpixel data (which is equivalent to $P1_{(i,j)}$) located in the pixel coordinate (i,j) in the first adjusted image signal P1, and $B_{(3i-1,3j+j+k)}$ represents the corresponding subpixel data $B_{(3i-1,3j+1)}$ and the adjacent subpixel data (which is equivalent to $HR_k$) in the horizontal direction.

In yet another example, if it is assumed that the direction is a 135-degree direction, and the filter range value q is 2, referring FIG. 1 and FIG. 2, after the green-color subpixel $G_{(3i,3j)}$ located in the pixel coordinate (3i,3j) in the original image signal HR is selected as the corresponding subpixel data $HR_0$, the one-directional downsampling circuit 210 may calculate $$g_{1d(i,j)} = \sum_{k=-2}^{2} c_k G_{(3i+k,3j+k)}.$$

In another embodiment, if the blue-color subpixel $B_{(3i-1,3j+1)}$ located in the pixel coordinate (3i−1,3j+1) in the original image signal HR is selected as the corresponding subpixel data $HR_0$, the one-directional downsampling circuit 210 may calculate $$b_{1d(i,j)} = \sum_{k=-2}^{2} c_k B_{(3i-1,3j+1+k)}.$$

The multi-directional downsampling circuit 220 receives the original image signal HR and performs multi-directional downsampling by using the original image signal HR to obtain and output a second adjusted image signal P2, where a resolution of the second adjusted image signal P2 is less than the resolution of the original image signal HR (which can be inferred according to the description with respect to FIG. 1). For example, in some embodiments (by not limited thereto), the multi-directional downsampling performed by the multi-directional downsampling circuit 220 may include the following operations. The multi-directional downsampling circuit 220 selects one corresponding subpixel data from a plurality of subpixel data of the original image signal HR. After the corresponding subpixel data is selected, the multi-directional downsampling circuit 220 may calculate $$P2_{(i,j)} = \sum_{k1=-q}^{q} \sum_{k2=-q}^{q} c_{(k1,k2)} HR_{(k1,k2)}$$

to perform a two-directional filter operation. $P2_{(i,j)}$ represents subpixel data located in the coordinate (i,j) in the second adjusted image signal P2, q represents the filter range value and is an integer. In the filter range $HR_{-q}$ to $HR_q$, $HR_{(0,0)}$ represents the corresponding sub-pixel data in the original image signal HR, the rest of $HR_{(k1,k2)}$ represent subpixel data adjacent to the corresponding subpixel data $HR_{(0,0)}$ in the original image signal HR, $c_{(k1,k2)}$ represents a filter value corresponding to each subpixel data $HR_{(k1,k2)}$ in the original image signal HR, where $0 \leq c_{(k1,k2)} \leq 1$, and the filter value $c_k$ may be determined based on design requirements.

For example, if it is assumed that the filter range value q is 2, referring FIG. 1 and FIG. 2, after the green-color subpixel $G_{(3i,3j)}$ located in the pixel coordinate (3i,3j) in the original image signal HR is selected as the corresponding subpixel data $HR_{(0,0)}$, the multi-directional downsampling circuit 220 may calculate $$g_{2d(i,j)} = \sum_{k1=-2}^{2} \sum_{k2=-2}^{2} c_{(k1,k2)} G_{(3i+k1,3j+k2)}.$$

Therein, $g_{2d(i,j)}$ represents green-color subpixel data (which is equivalent/reference to $P1_{(i,j)}$) located in the pixel coordinate (i,j) in the second adjusted image signal P2, while $G_{(3i-2,3j-2)}$ to $G_{(3i-2,3j+2)}$, $G_{(3i-1,3j-2)}$ to $G_{(3i-1,3j+2)}$, $G_{(3i,3j-2)}$ to $G_{(3i,3j+2)}$, $G_{(3i+1,3j-2)}$ to $G_{(3i+1,3j+2)}$ and $G_{(3i+2,3j-2)}$ to $G_{(3i+2,3j+2)}$ represent the corresponding pixel data $G_{(3i,3j)}$ and the adjacent pixel data (which is equivalent/reference to $HR_{(k1,k2)}$). In another embodiment, if the blue-color subpixel $B_{(3i-1,3j+1)}$ located in the pixel coordinate (3i−1,3j+1) in the original image signal HR is selected as the corresponding subpixel data $HR_{(0,0)}$, the multi-directional downsampling circuit 220 may calculate $$b_{2d(i,j)} = \sum_{k1=-2}^{2} \sum_{k2=-2}^{2} c_{(k1,k2)} B_{(3i-1+k1,3j+1+k2)},$$

where $b_{2d(i,j)}$ represents blue-color subpixel data (which is equivalent/reference to $P1_{(i,j)}$) located in the coordinate (i,j) in the second adjusted image signal P2, while $B_{(3i-1-2,3j+1-2)}$ to $B_{(3i-1-2,3j+1+2)}$, $B_{(3i-1-1,3j+1-2)}$ to $B_{(3i-1-1,3j+1+2)}$, $B_{(3i-1,3j+1-2)}$ to $B_{(3i-1,3j+1+2)}$, $B_{(3i-1+1,3j+1-2)}$ to $B_{(3i-1+1,3j-1-2)}$ and $B_{(3i-1+2,3j+1-2)}$ to $B_{(3i-1+2,3j+1+2)}$ represent the corresponding subpixel data $B_{(3i-1,3i+1)}$ and the adjacent subpixel data (which is equivalent/reference to $HR_k$).

In other embodiments, the one-directional downsampling circuit 210 may perform 1D filter subpixel-based downsampling, and the multi-directional downsampling circuit 220 may perform 2D filter subpixel-based downsampling. In a few application scenarios, the 1D filter subpixel-based downsampling may have the issues of line-broken and color fringing artifact, but provide a high-sharpness image. In a few application scenarios, the 2D filter subpixel-based downsampling may have an issue of sharpness loss, but less probability for causing line-broken and color fringing artifact.

The output circuit 230 is coupled to an output terminal of the one-directional downsampling circuit 210 and an output terminal of the multi-directional downsampling circuit 220. The output circuit 230 obtains and outputs the downsampled image signal LR according to the first adjusted image signal P1 output by the one-directional downsampling circuit 210 and the second adjusted image signal P2 output by the multi-directional downsampling circuit 220. For example, in some embodiments, when the original image signal HR (or the downsampled image signal LR) is a color image, the output circuit 230 may select the first adjusted image signal P1 output by the one-directional downsampling circuit 210 as the downsampled image signal LR, and when the original image signal HR (or the downsampled image signal LR) is a monochrome (grayscale) image, the output circuit 230 may select the second adjusted image signal P2 output by the multi-directional downsampling circuit 220 as the downsampled image signal LR.

In some other embodiments, the output circuit 230 may determine a component ratio of the first adjusted image signal P1 to the second adjusted image signal P2 or weights of the first adjusted image signal P1 and the second adjusted image signal P2 in the downsampled image signal LR according to characteristics of the original image signal HR (or the downsampled image signal LR). For example, the output circuit 230 may calculate the downsampled image signal LR by using a formula, LR=α*P2+(1×α)*P1, where a is less than or equal to 1 and greater than or equal to 0.

Since the component of the downsampled image signal LR may selectively contain the first adjusted image signal P1 and/or the second adjusted image signal P2, the image downsampling apparatus 200 may adaptively mitigate the issues of line-broken and color fringing artifact and reduce the sharpness loss.

Figure 3:
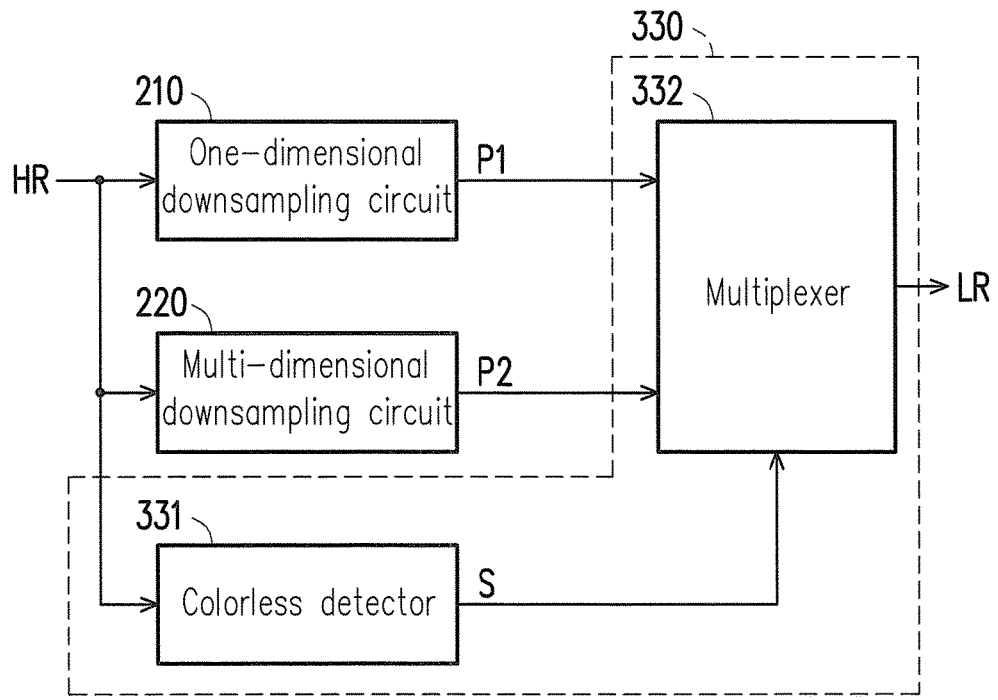
FIG. 3 is a schematic diagram of an image downsampling apparatus according to another embodiment of the invention.

FIG. 3 is a schematic diagram of an image downsampling apparatus 300 according to another embodiment of the invention. The image downsampling apparatus 300 includes a one-dimensional downsampling circuit 210, a multi-dimensional downsampling circuit 220 and an output circuit 330. The image downsampling apparatus 300, the one-directional downsampling circuit 210, the multi-directional downsampling circuit 220 and the output circuit 330 illustrated in FIG. 3 may be deduced with reference to the description with respect to the image downsampling apparatus 200, the one-directional downsampling circuit 210, the multi-directional downsampling circuit 220 and the output circuit 230 illustrated in FIG. 2.

In the embodiment illustrated in FIG. 3, the output circuit 330 includes a colorless detector 331 and a multiplexer 332. The colorless detector 331 receives the original image signal HR and performs colorless detection by using the original image signal HR to obtain and output a detection result S. For example, in some embodiments (but not limited to), the colorless detector 331 may calculate $$m_T = \sum_{k1} \sum_{k2} (|R_{(a*i+k1,a*j+k2)} - G_{(a*i+k1,a*j+k2)}| + |R_{(a*i+k1,a*j+k2)} - B_{(a*i+k1,a*j+k2)}| + |G_{(a*i+k1,a*j+k2)} - B_{(a*i+k1,a*j+k2)}|).$$

Therein, $R_{(a*i+k1,a*j+k2)}$ represents red-color data of a corresponding pixel position (a*i+k1, a*j+k2) in the original image signal HR, $G_{(a*i+k1,a*j+k2)}$ represents green-color data of the corresponding pixel position (a*i+k1, a*j+k2) in the original image signal HR, and $B_{(a*i+k1,a*j+k2)}$ represents blue-color data of the corresponding pixel position (a*i+k1, a*j+k2) in the original image signal HR. When $m_T$ is less than or equal to a threshold $T_2$, the colorless detector 331 sets the detection result S as a first logic value (e.g., 1 or any other logic value), and when $m_T$ is greater than the threshold $T_2$, the colorless detector 331 sets the detection result S as a second logic value (e.g., 0 or any other logic value).

The a is a positive integer and may be determined based on design requirements. For example, in some embodiments, a may be 3 (which can be inferred according to the description with respect to FIG. 1), and −2≤k1≤2, and −2≤k2≤2. The colorless detector 331 may calculate $$m_T = \sum_{k1=-2}^{2} \sum_{k2=-2}^{2} (|R_{(3i+k1,3j+k2)} - G_{(3i+k1,3j+k2)}| + |R_{(3i+k1,3j+k2)} - B_{(3i+k1,3j+k2)}| + |G_{(3i+k1,3j+k2)} - B_{(3i+k1,3j+k2)}|).$$

When $m_T$ is less than or equal to the threshold $T_2$, the detection result S corresponding to the pixel position (i,j) in the downsampled image signal LR is set as the logic value of 1, and when $m_T$ is greater than the threshold $T_2$, the detection result S corresponding to the pixel position (i,j) in the downsampled image signal LR is set as the logic value of 0.

A first input terminal and a second input terminal of the multiplexer 332 are respectively coupled to the output terminal of the one-directional downsampling circuit 210 and the output terminal of the multi-directional downsampling circuit 220, a control terminal of the multiplexer 332 is coupled to an output terminal of the colorless detector 331 to receive the detection result S, and an output terminal of the multiplexer 332 outputs the downsampled image signal LR. The multiplexer 332 selects the first adjusted image signal P1 or the second adjusted image signal P2 as the downsampled image signal LR according to the detection result S. For example, when the detection result S indicates that the original image signal HR is determined as a color image, the multiplexer 332 may select to output the first adjusted image signal P1 as the downsampled image signal LR; and when the detection result S indicates that the original image signal HR is determined as a monochrome (or grayscale) image, the multiplexer 332 may select to output the second adjusted image signal P2 as the downsampled image signal LR.

Figure 4:
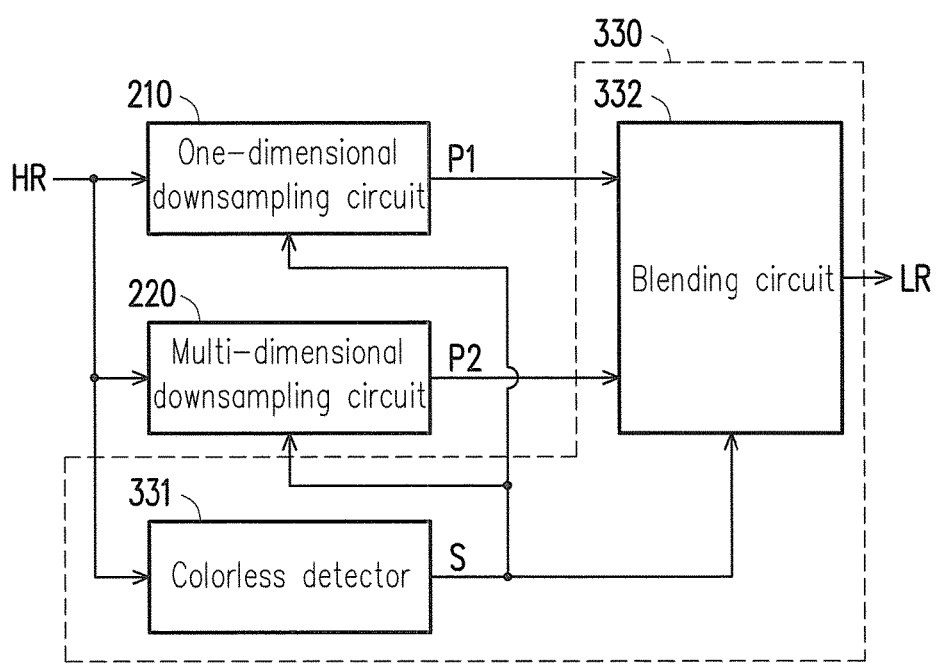
FIG. 4 is a schematic diagram of an image downsampling apparatus according to yet another embodiment of the invention.

FIG. 4 is a schematic diagram of an image downsampling apparatus 400 according to yet another embodiment of the invention. The image downsampling apparatus 400 includes a one-dimensional downsampling circuit 210, a multi-dimensional downsampling circuit 220 and an output circuit 330. The embodiment illustrated in FIG. 4 may be inferred with reference to the descriptions related to the embodiments illustrated in FIG. 2 and FIG. 3. In the embodiment illustrated in FIG. 4, the one-directional downsampling circuit 210 and the multi-directional downsampling circuit 230 are further coupled to an output terminal of the colorless detector 331 to receive the detection result S.

Figure 5:
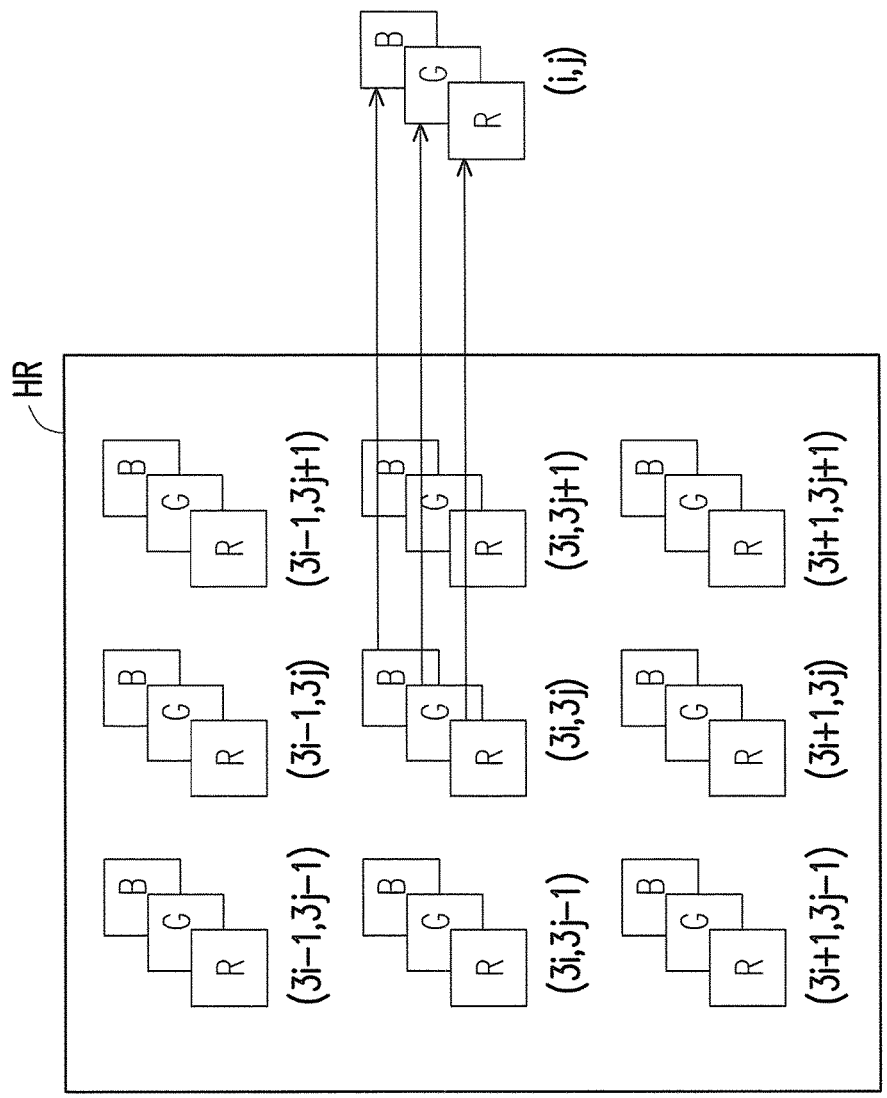
FIG. 5 is a schematic diagram of image downsampling according to an embodiment of the invention.

When the detection result S is the first logic value (e.g., 1 or any other logic value), the one-directional downsampling circuit 210 performs the one-directional downsampling according to red-color data $R_{(a*i,a*j)}$, green-color data $G_{(a*i,a*j)}$ and blue-color data $B_{(a*i,a*j)}$ of a certain corresponding pixel position (a*i,a*j) in the original image signal HR to obtain red-color subpixel data, green-color subpixel data and blue-color subpixel data located in the pixel coordinate (i,j) in the first adjusted image signal P1, where a is an integer and may be determined based on design requirements. For example, in some embodiments, a may be 3 (which can be inferred according to the description with respect to FIG. 1). FIG. 5 is a schematic diagram of image downsampling according to an embodiment of the invention. Referring to FIG. 4 and FIG. 5, for example, when the detection result S is the logic value of 1, the one-directional downsampling circuit 210 may select each of the red-color data $R_{(a*i,a*j)}$, the green-color data $G_{(a*j,a*j)}$ and the blue-color data $B_{(a*i,a*j)}$ of the corresponding pixel located in the position (a*i,a*j) in the original image signal HR to perform the one-directional downsampling (the one-directional filter operation) to obtain the red-color subpixel data $r_{1d(i,j)}$, the green-color subpixel data $g_{1d(i,j)}$ and the blue-color subpixel data $b_{1d(i,j)}$ located in the pixel coordinate (i,j) in the first adjusted image signal P1.

When the detection result S is the first logic value (e.g., 1 or any other logic value), the multi-directional downsampling circuit 220 performs the multi-directional downsampling according to red-color data $R_{(a*i,a*j)}$, green-color data $G_{(a*i,a*j)}$ and blue-color data $B_{(a*i,a*j)}$ of a certain corresponding pixel located in the position (a*i,a*j) in the original image signal HR to obtain the red-color subpixel data, the green-color subpixel data and the blue-color subpixel data located in the pixel coordinate (i,j) in the second adjusted image signal. In some embodiments, a may be 3 (which can be inferred according to the description with respect to FIG. 1) or any other integer. Referring to FIG. 4 and FIG. 5, for example, when the detection result S is the logic value of 1, the multi-directional downsampling circuit 220 may select each of the red-color data $R_{(a*i,a*j)}$, the green-color data $G_{(a*i,a*j)}$ and the blue-color data $B_{(a*i,a*j)}$ corresponding to a pixel position (3i,3j) in the original image signal HR to perform the multi-directional downsampling (the multi-directional filter operation) to obtain red-color subpixel data $r_{2d(i,j)}$, green-color subpixel data $g_{2d(i,j)}$ and blue-color subpixel data $b_{2d(i,j)}$ located in the pixel coordinate (i,j) in the second adjusted image signal P2.

When the detection result S is the second logic value (e.g., 0 or any other logic value), the one-directional downsampling circuit 210 selects red-color data of a first corresponding pixel, green-color data of a second corresponding pixel and blue-color data of a third corresponding pixel from the original image signal HR in one sampling direction to perform the one-directional downsampling (the one-directional filter operation) to obtain the red-color subpixel data, the green-color subpixel data and the blue-color subpixel data located in the pixel coordinate (i,j) in the first adjusted image signal P1. One of the first corresponding pixel, the second corresponding pixel and the third corresponding pixel has the pixel coordinate (a*i,a*j) in the original image signal.

Figure 6:
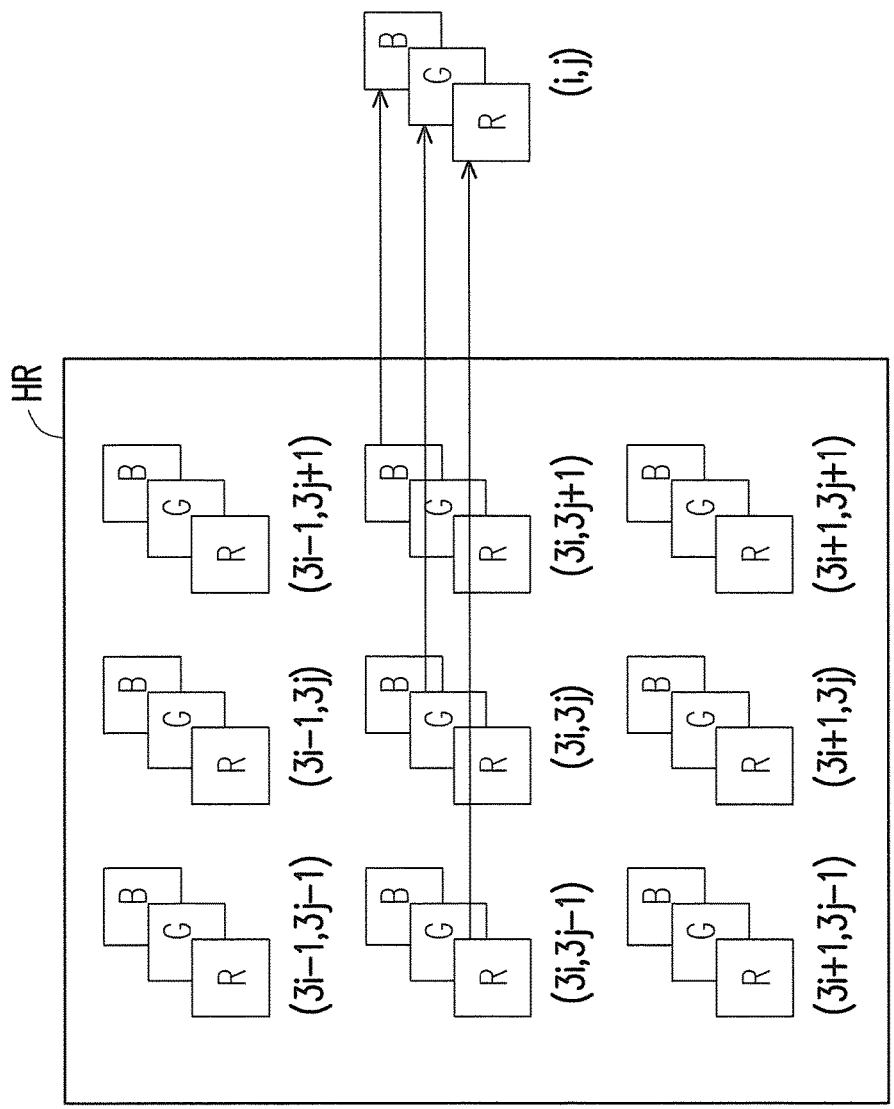
FIG. 6 is a schematic diagram of image downsampling according to another embodiment of the invention.

For example, the sampling direction may be a 0-degree direction (a horizontal direction, a column direction or a row direction), and a may be 3. FIG. 6 is a schematic diagram of image downsampling according to another embodiment of the invention. When the detection result S is the logic value of 0, the one-directional downsampling circuit 210 may select red-color data $R_{(3i,3j-1)}$ of a pixel (3i,3j-1), green-color data $G_{(3i,3j)}$ of a pixel (3i,3j) and blue-color data $B_{(3i,3j+1)}$ of a pixel (3i,3j+1) from the original image signal HR in the 0-degree direction to perform the one-directional downsampling (the one-directional filter operation) to obtain red-color subpixel data $r_{1d(i,j)}$, green-color subpixel data $g_{1d(i,j)}$ and blue-color subpixel data $b_{1d(i,j)}$ located in the pixel coordinate (i,j) in the first adjusted image signal P1.

Figure 7:
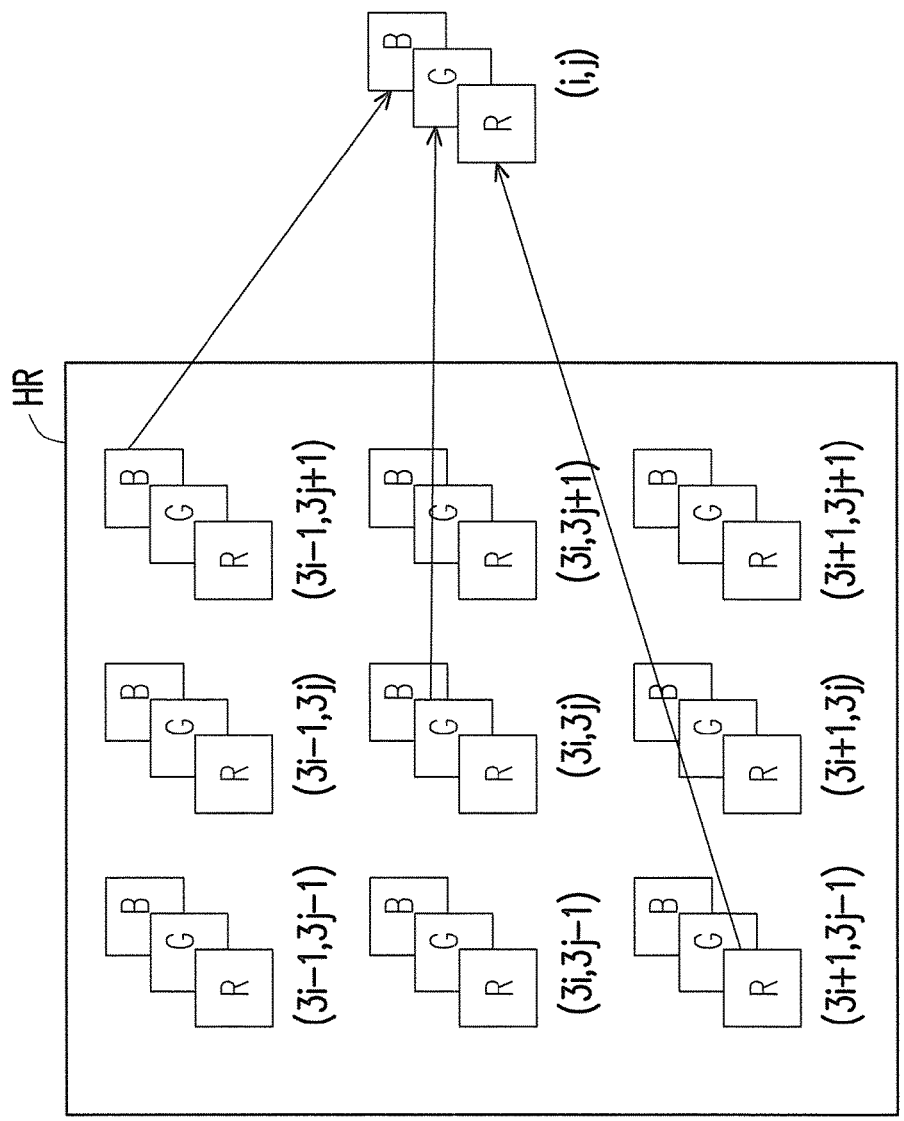
FIG. 7 is a schematic diagram of image downsampling according to yet another embodiment of the invention.

In another example, the sampling direction may be a 45-degree direction, and a may be 3. FIG. 7 is a schematic diagram of image downsampling according to yet another embodiment of the invention. When the detection result S is the logic value of 0, the one-directional downsampling circuit 210 may select red-color data $R_{(3i+1,3j-1)}$ of a pixel (3i+1,3j+1), green-color data $G_{(3i,3j)}$ of a pixel (3i,3j) and the blue-color data $B_{(3i-1,3j+1)}$ of a pixel (3i-1,3j+1) from the original image signal HR in the 45-degree direction to perform the one-directional downsampling (the one-directional filter operation) to obtain the red-color subpixel data $r_{1d(i,j)}$, the green-color subpixel data $g_{1d(i,j)}$ and the blue-color subpixel data $b_{1d(i,j)}$ located in the pixel coordinate (i,j) in the first adjusted image signal P1.

Figure 8:
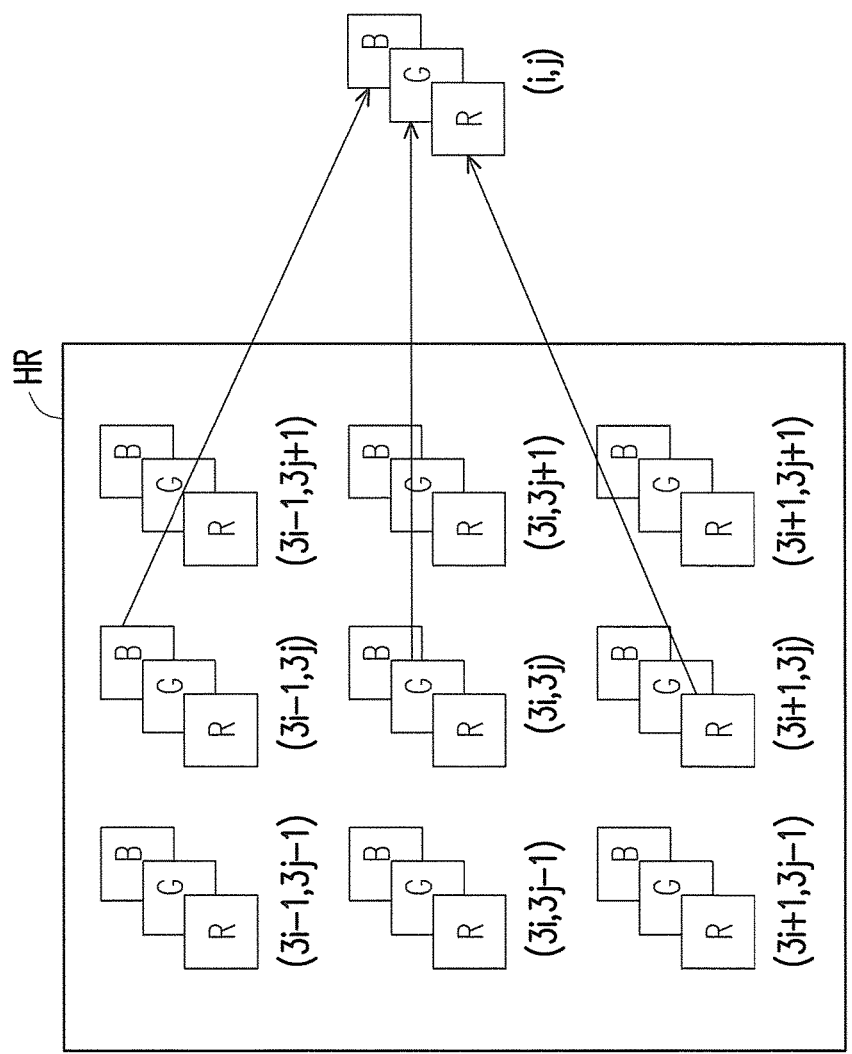
FIG. 8 is a schematic diagram of image downsampling according to still another embodiment of the invention.

In yet another example, the sampling direction may be a 90-degree direction (a horizontal direction, a row direction or a column direction), and a may be 3. FIG. 8 is a schematic diagram of image downsampling according to still another embodiment of the invention. When the detection result S is the logic value of 0, the one-directional downsampling circuit 210 may select red-color data $R_{(3i+1,3j)}$ of a pixel (3i+1,3j), green-color data $G_{(3i,3j)}$ of a pixel (3i,3j) and blue-color data $B_{(3i-1,3j)}$ of a pixel (3i-1,3j) from the original image signal HR in the 90-degree direction to perform the one-directional downsampling (the one-directional filter operation) to obtain the red-color subpixel data $r_{1d(i,j)}$, the green-color subpixel data $g_{1d(i,j)}$ and the blue-color subpixel data $b_{1d(i,j)}$ located in the pixel coordinate (i,j) in the first adjusted image signal P1.

Figure 9:
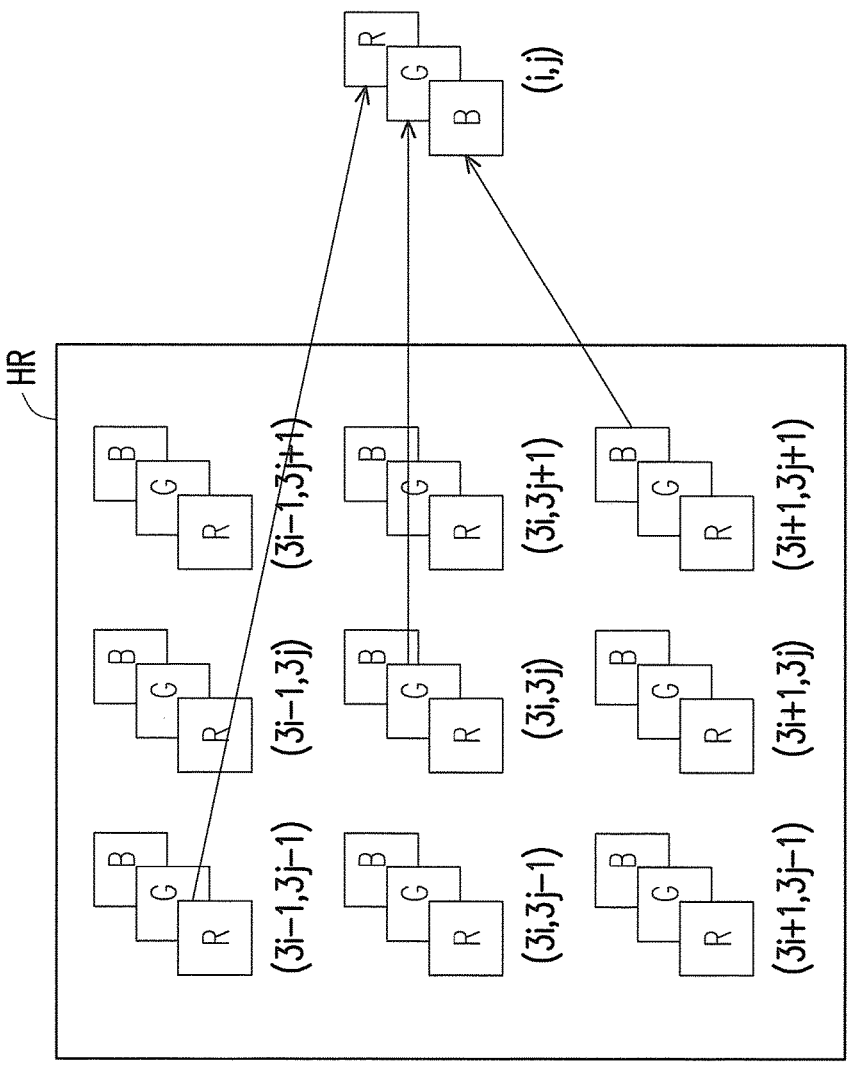
FIG. 9 is a schematic diagram of image downsampling according to further another embodiment of the invention.

In still another example, the sampling direction may be a 135-degree direction, and a may be 3. FIG. 9 is a schematic diagram of image downsampling according to still another embodiment of the invention. When the detection result S is the logic value of 0, the one-directional downsampling circuit 210 may select red-color data $R_{(3i-1,3j-1)}$ of a pixel (3i−1,3j−1), green-color data $G_{(3i,3j)}$ of a pixel (3i,3j) and blue-color data $B_{(3i+1,3j+1)}$ of a pixel (3i+1,3j+1) from the original image signal HR in the 135-degree direction to perform the one-directional downsampling (the one-directional filter operation) to obtain the red-color subpixel data $r_{1d(i,j)}$, the green-color subpixel data $g_{1d(i,j)}$ and the blue-color subpixel data $b_{1d(i,j)}$ located in the pixel coordinate (i,j) in the first adjusted image signal P1.

When the detection result S is the second logic value (e.g., 0 or any other logic value), the multi-directional downsampling circuit 220 selects the red-color data of the first corresponding pixel, the green-color data of the second corresponding pixel and the blue-color data of the third corresponding pixel from the original image signal HR in one sampling direction to perform the multi-directional downsampling (the multi-directional filter operation) to obtain red-color subpixel data, green-color subpixel data and blue-color subpixel data located in the pixel coordinate (i,j) in the second adjusted image signal P2. One of the first corresponding pixel, the second corresponding pixel and the third corresponding pixel has the pixel coordinate (a*i,a*j) in the original image signal HR.

For example, the sampling direction may be a 0-degree direction (a horizontal direction, a column direction or a row direction), and a may be 3. When the detection result S is the logic value of 0, the multi-directional downsampling circuit 220 may select the red-color data $R_{(3i,3j-1)}$ of the pixel (3i,3j−1), the green-color data $G_{(3i,3j)}$ of the pixel (3i,3j) and the blue-color data $B_{(3i,3j+1)}$ of the pixel (3i,3j+1) from the original image signal HR in the 0-degree direction (as shown in FIG. 6) to perform the multi-directional downsampling (the multi-directional filter operation) to obtain red-color subpixel data $r_{2d(i,j)}$, green-color subpixel data $g_{2d(i,j)}$ and blue-color subpixel data $b_{2d(i,j)}$ located in the pixel coordinate (i,j) in the second adjusted image signal P2.

In another example, the direction may be a 45-degree direction, and a may be 3. When the detection result S is the logic value of 0, the multi-directional downsampling circuit 220 may select the red-color data $R_{(3i+1,3j-1)}$ of the pixel (3i+1,3j−1), the green-color data $G_{(3i,3j)}$ of the pixel (3i,3j) and the blue-color data $B_{(3i-1,3j+1)}$ of the pixel (3i−1,3j+1) from the original image signal HR in the 45-degree direction (as shown in FIG. 7) to perform the multi-directional downsampling (the multi-directional filter operation) to obtain red-color subpixel data $r_{2d(i,j)}$, green-color subpixel data $g_{2d(i,j)}$ and blue-color subpixel data $b_{2d(i,j)}$ located in the pixel coordinate (i,j) in the second adjusted image signal P2.

In yet another example, the direction may be a 90-degree direction (a vertical direction, a row direction or a column direction), and a may be 3. When the detection result S is the logic value of 0, the one-directional downsampling circuit 220 may select the red-color data $R_{(3i+1,3j-1)}$ of the pixel (3i+1,3j−1), the green-color data $G_{(3i,3j)}$ of the pixel (3i,3j) and the blue-color data $B_{(3i-1,3j+1)}$ of the pixel (3i−1,3j+1) from the original image signal HR in the 90-degree direction to perform the one-directional downsampling (the one-directional filter operation) to obtain red-color subpixel data $r_{2d(i,j)}$, green-color subpixel data $g_{2d(i,j)}$ and blue-color subpixel data $b_{2d(i,j)}$ located in the pixel coordinate (i,j) in the second adjusted image signal P2.

In still another example, the direction may be a 135-degree direction, and a may be 3. When the detection result S is the logic value of 0, the one-directional downsampling circuit 220 may select the red-color data $R_{(3i-1,3j-1)}$ of the pixel (3i−1,3j−1), the green-color data $G_{(3i,3j)}$ of the pixel (3i,3j) and the blue-color data $B_{(3i+1,3j+1)}$ of the pixel (3i+1,3j+1) from the original image signal HR in the 135-degree direction (as shown in FIG. 9) to perform the multi-directional downsampling (the multi-directional filter operation) to obtain red-color subpixel data $r_{2d(i,j)}$, green-color subpixel data $g_{2d(i,j)}$ and blue-color subpixel data $b_{2d(i,j)}$ located in the pixel coordinate (i,j) in the second adjusted image signal P2.

Figure 10:
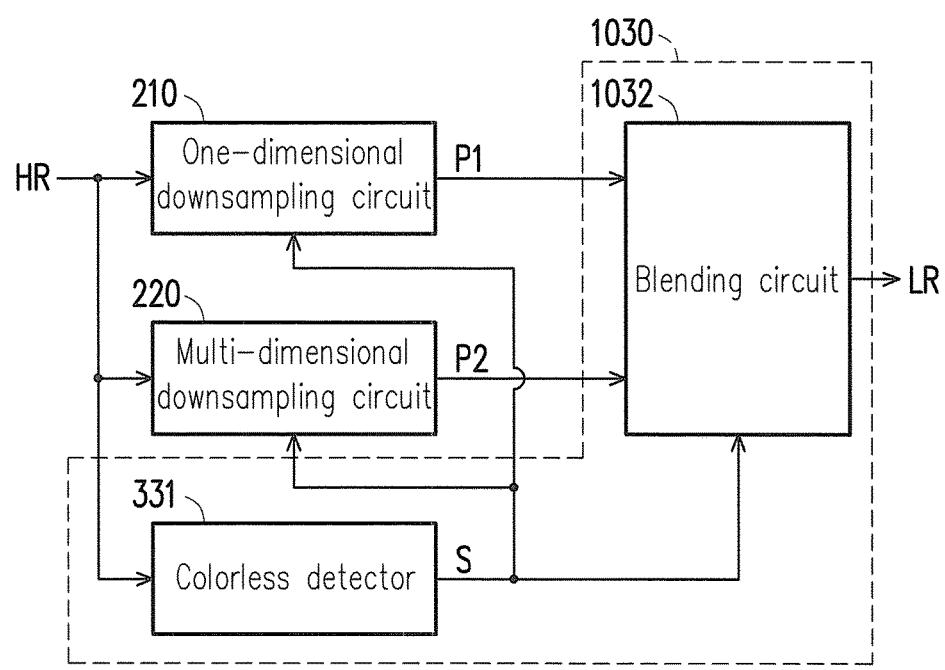
FIG. 10 is a schematic diagram of an image downsampling apparatus according to still another embodiment of the invention.

FIG. 10 is a schematic diagram of an image downsampling apparatus 1000 according to yet another embodiment of the invention. The image downsampling apparatus 1000 includes a one-dimensional downsampling circuit 210, a multi-dimensional downsampling circuit 220 and an output circuit 1030. The embodiment illustrated in FIG. 10 may be inferred with reference to the description related to the embodiments illustrated in FIG. 4. In the embodiment illustrated in FIG. 10, the output circuit 1030 includes a colorless detector 331 and a blending circuit 1032. The colorless detector 331 receives the original image signal HR and performs the colorless detection by using the original image signal HR to obtain and output the detection result S. A first input terminal and a second input terminal of the blending circuit 1032 are respectively coupled to an output terminal of the one-directional downsampling circuit 210 and an output terminal of the multi-directional downsampling circuit 220, a control terminal of the blending circuit 1032 is coupled to an output terminal of the colorless detector 331 to receive the detection result S.

An output terminal of the blending circuit 1032 outputs the downsampled image signal LR. The blending circuit 1032 may determine a weight w1 of the first adjusted image signal P1 and a weight w2 of the second adjusted image signal P2 in the downsampled image signal LR. For example, the downsampled image signal LR may be obtained based on calculation of P1*w1+P2*w2, where 0≤w1≤1, and 0≤w2≤1. In some embodiments, when the detection result S is the first logic value (e.g., 1 or any other logic value), the blending circuit 1032 may set the weight w1 as 0 and set the weight w2 as 1. When the detection result S is the second logic value (e.g., 0 or any other logic value), the blending circuit 1032 may set the weight w1 as 1 and set the weight w2 as 0. In some other embodiments, when the detection result S is the first logic value (e.g., 1 or any other logic value), the blending circuit 1032 may set the weight w1 as 0.1 and set the weight w2 as 0.9. When the detection result S is the second logic value (e.g., 0 or any other logic value), the blending circuit 1032 may set the weight w1 as 0.9 and set the weight w2 as 0.1.

Figure 11:
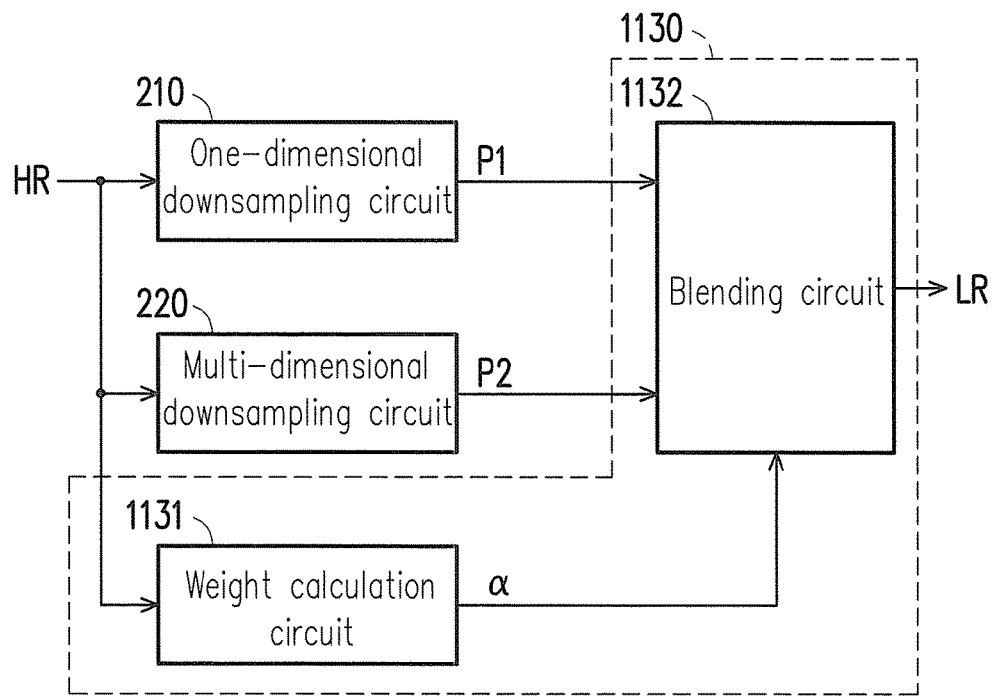
FIG. 11 is a schematic diagram of an image downsampling apparatus according to further another embodiment of the invention.

FIG. 11 is a schematic diagram of an image downsampling apparatus 1100 according to further another embodiment of the invention. The image downsampling apparatus 1100 includes a one-dimensional downsampling circuit 210, a multi-dimensional downsampling circuit 220 and an output circuit 1130. The embodiment illustrated in FIG. 11 may be inferred with reference to the descriptions related to the embodiments illustrated in FIG. 2, FIG. 3 and FIG. 10. In the embodiment illustrated in FIG. 11, the output circuit 1130 includes a weight calculation circuit 1131 and a blending circuit 1132. The weight calculation circuit 1131 receives the original image signal HR and calculates a weight value α by using the original image signal HR. For example, the weight calculation circuit 1131 may perform a Gaussian filter operation on the original image signal HR to obtain a plurality of first weights W corresponding to different pixel positions. An algorithm for the Gaussian filter operation may be determined based on design requirements. In some embodiments, the Gaussian filter operation includes calculating $$W_{(x,y)} = \frac{1}{\sigma^2}\left(\frac{x^2+y^2}{\sigma^2}-2\right)e^{\frac{-(x^2+y^2)}{2\sigma^2}} * HR_{(x,y)},$$

where $W_{(x,y)}$ is a first weight W corresponding to a pixel coordinate (x,y) in the original image signal HR, σ is a real number and may be determined based on design requirements, such as 0.8 or any other real number, and $HR_{(x,y)}$ represents pixel data having a pixel coordinate (x,y) in the original image signal HR. For example, $HR_{(x,y)}$ may be the red-color subpixel data $R_{(x,y)}$, the green-color subpixel data $G_{(x,y)}$ or the blue-color subpixel data $B_{(x,y)}$ located in the pixel coordinate (x,y).

Figure 12:
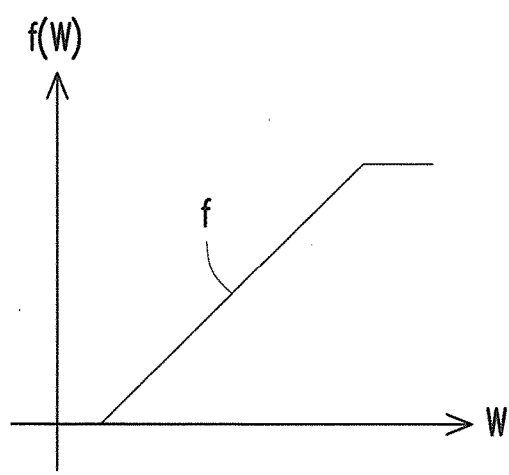
FIG. 12 is a schematic diagram of a conversion curve according to an embodiment of the invention.

The weight calculation circuit 1131 may convert the plurality of first weights W into a plurality of second weights f(W) according to a conversion curve f, where the conversion curve f may be determined based on design requirements. For example, FIG. 12 is a schematic diagram of a conversion curve f according to an embodiment of the invention. In FIG. 12, the horizontal axis represents the first weight W, and the vertical axis represents the second weight f(W). The weight calculation circuit 1131 may converts different first weights W into the second weights f(W) according to the conversion curve f in FIG. 12.

After the conversion, the weight calculation circuit 1131 may obtain the weight value α according to at least one of the plurality of second weights f(W). For example, the weight calculation circuit 1131 selects the maximum from the second weights f(W) to serve it as the weight value α. In other embodiments, the weight calculation circuit 1131 may calculate the weight value α of the second weights f(W) by using another algorithm. For example, the weight calculation circuit 1131 may calculate an average of the second weights f(W) and serve it as the weight value α.

A first input terminal and a second input terminal of the blending circuit 1132 are respectively coupled to an output terminal of the one-directional downsampling circuit 210 and an output terminal of the multi-directional downsampling circuit 220, a control terminal of the blending circuit 1131 is coupled to an output terminal of the weight calculation circuit 1131 to receive the weight value α, and an output terminal of the blending circuit 1132 outputs the downsampled image signal LR. The blending circuit 1132 determines a component ratio of the first adjusted image signal P1 to the second adjusted image signal P2 in the downsampled image signal LR according to the weight value α. For example, the blending circuit 1132 may calculate a formula, LR=α*P2+(1−α)*P1, where 0≤α≤1.

Figure 13:
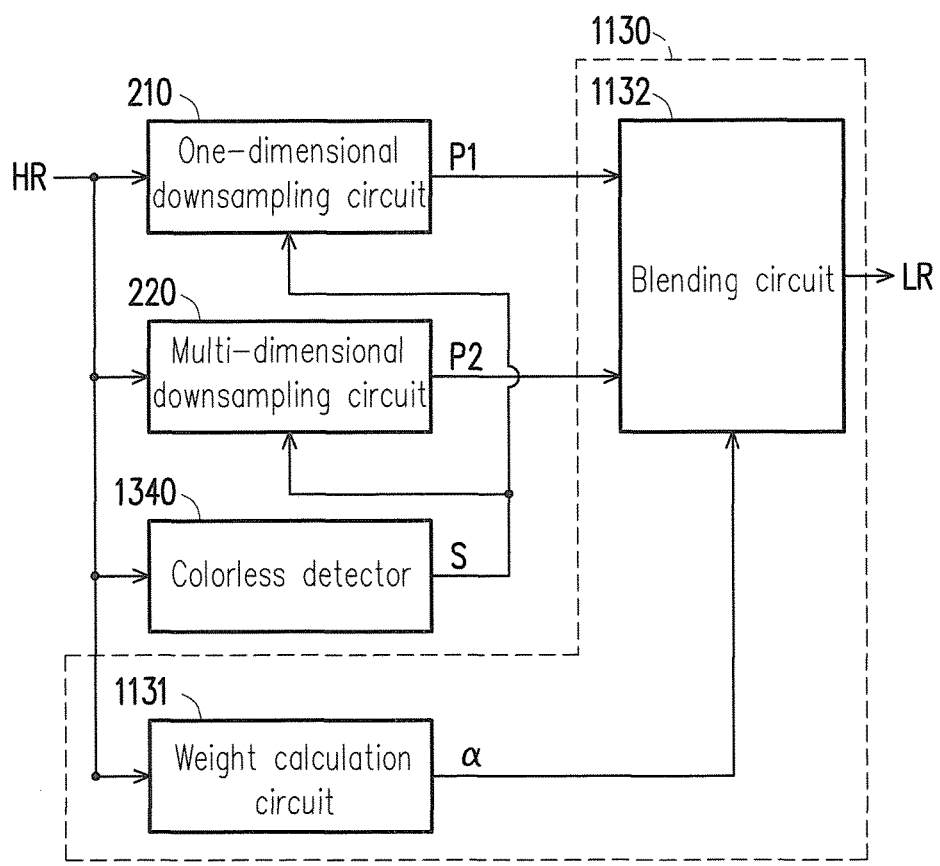
FIG. 13 is a schematic diagram of an image downsampling apparatus according to further another embodiment of the invention.

FIG. 13 is a schematic diagram of an image downsampling apparatus 1300 according to further another embodiment of the invention. The image downsampling apparatus 1300 includes a one-dimensional downsampling circuit 210, a multi-dimensional downsampling circuit 220 and an output circuit 1130. The embodiment illustrated in FIG. 13 may be inferred with reference to the descriptions related to the embodiments illustrated in FIG. 4 and FIG. 11. In the embodiment illustrated in FIG. 13, the image downsampling apparatus 1300 further includes a colorless detector 1340. The colorless detector 1340 receives the original image signal HR and performs the colorless detection by using the original image signal HR to obtain and output the detection result S to the one-directional downsampling circuit 210 and the multi-directional downsampling circuit 220. The colorless detector 1340 illustrated in FIG. 13 may be inferred with reference to the descriptions related to the colorless detector 331 illustrated in FIG. 3 or FIG. 4. The one-directional downsampling circuit 210 and the multi-directional downsampling circuit 220 illustrated in FIG. 13 may be deduced with reference to the description with respect to the one-directional downsampling circuit 210 and the multi-directional downsampling circuit 220 illustrated in FIG. 4 and thus, will not be repeated hereinafter.

Figure 14:
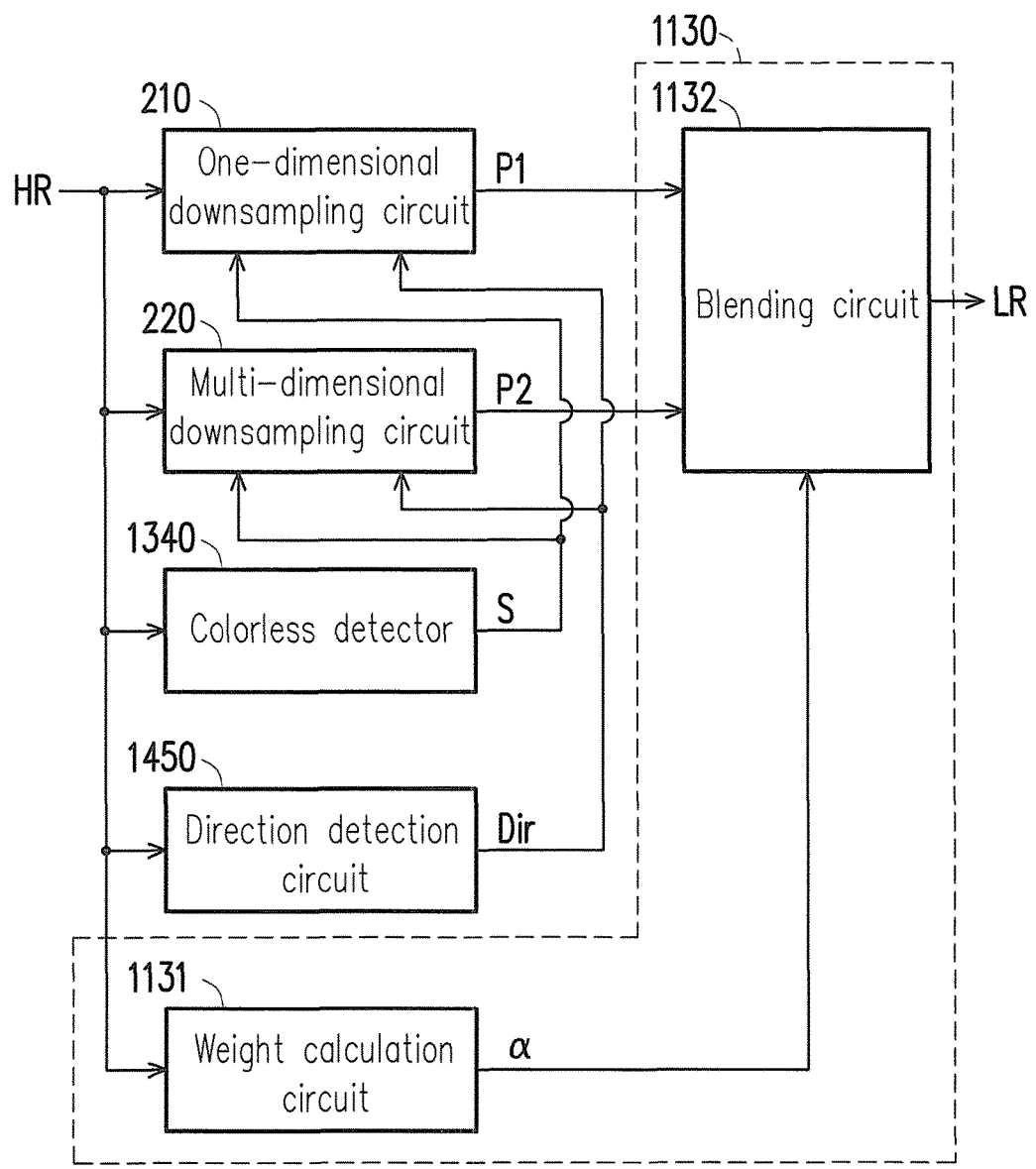
FIG. 14 is a schematic diagram of an image downsampling apparatus according to another embodiment of the invention.

FIG. 14 is a schematic diagram of an image downsampling apparatus 1400 according to another embodiment of the invention. The image downsampling apparatus 1400 includes a one-dimensional downsampling circuit 210, a multi-dimensional downsampling circuit 220 and an output circuit 1130, a colorless detector 1340 and a direction detection circuit 1450. The embodiment illustrated in FIG. 14 may be inferred with reference to the description related to the embodiment illustrated in FIG. 13. In the embodiment illustrated in FIG. 14, the direction detection circuit 1450 receives the original image signal HR and performs colorless detection by using the original image signal HR to obtain and output direction information Dir to the one-directional downsampling circuit 210 and the multi-directional downsampling circuit 220. The direction information Dir controls and determines the sampling direction of the one-directional downsampling circuit 210 and the multi-directional downsampling circuit 220.

The direction detection circuit 1450 may calculate a difference value between each adjacent pixels in different directions and determines the direction information Dir according to the difference values between adjacent pixels. For example, the direction detection circuit 1450 may calculate a difference value $E_0$ between each adjacent pixels in the 0-degree direction, a difference value $E_{45}$ between each adjacent pixels in the 45-degree direction, a difference value $E_{90}$ between each adjacent pixels in the 90-degree direction, and a difference value $E_{135}$ between each adjacent pixels in the 135-degree direction. Implementation details related to the difference values $E_0$, $E_{45}$, $E_{90}$ and $E_{135}$ of the adjacent pixels will be described below. After the difference values $E_0$, $E_{45}$, $E_{90}$ and $E_{135}$ of the adjacent pixels in different directions are obtained, the direction detection circuit 1450 may determine the direction information Dir based on the difference values between the adjacent pixels. For example, the direction detection circuit 1450 may determine the direction information Dir based on the maximum among the difference values $E_0$, $E_{45}$, $E_{90}$ and $E_{135}$ between the adjacent pixels. Accordingly, if the difference value $E_0$ in the 0-degree direction is the maximum among the difference values $E_0$, $E_{45}$, $E_{90}$ and $E_{135}$ between the adjacent pixels, the direction information Dir is set as 90 degrees. If the difference value $E_{45}$ in the 45-degree direction is the maximum among the difference values $E_0$, $E_{45}$, $E_{90}$ and $E_{135}$ between the adjacent pixels, the direction information Dir is set as 135 degrees. If the difference value $E_{90}$ in the 90-degree direction is the maximum among the difference values $E_0$, $E_{45}$, $E_{90}$ and $E_{135}$ between the adjacent pixels, the direction information Dir is set as 0 degree. If the difference value $E_{135}$ in the 135-degree direction is the maximum among the difference values $E_0$, $E_{45}$, $E_{90}$ and $E_{135}$ between the adjacent pixels, the direction information Dir is set as 45 degrees.

Referring to FIG. 1, in some embodiments, the direction detection circuit 1450 may use the red-color subpixel data of different pixels in the original image signal HR to calculate the difference values $E_0$, $E_{45}$, $E_{90}$ and $E_{135}$ between the adjacent pixels. For example, the direction detection circuit 1450 may calculate $E_0=|R_{(3i-1,3j-1)}-R_{(3i-1,3j)}|+|R_{(3i-1,3j)}-R_{(3i-1,3j+1)}|+|R_{(3i,3j-1)}-R_{(3i,3j)}|+|R_{(3i,3j)}-R_{(3i,3j+1)}|+|R_{(3i+1,3j-1)}-R_{(3i+1,3j)}|+|R_{(3i+1,3j)}-R_{(3i+1,3j+1)}|$ to obtain the difference value $E_0$ between the adjacent pixels in the 0-degree direction, calculate $E_{45}=|R_{(3i-2,3j+1)}-R_{(3i-1,3j)}|+|R_{(3i-1,3j)}-R_{(3i,3j-1)}|+|R_{(3i-1,3j+1)}-R_{(3i,3j)}|+|R_{(3i,3j)}-R_{(3i+1,3j-1)}|+|R_{(3i,3j+1)}-R_{(3i+1,3j)}|+|R_{(3i+1,3j)}-R_{(3i+2,3j-1)}|$ to obtain the difference value $E_{45}$ between the adjacent pixels in the 45-degree direction, calculate $E_{90}=|R_{(3i-1,3j-1)}-R_{(3i,3j-1)}|+|R_{(3i,3j-1)}-R_{(3i+1,3j-1)}|+|R_{(3i-1,3j)}-R_{(3i,3j)}|+|R_{(3i,3j)}-R_{(3i+1,3j)}|+|R_{(3i-1,3j+1)}-R_{(3i,3j+1)}|+|R_{(3i,3j+1)}-R_{(3i+1,3j+1)}|$ to obtain the difference value $E_{90}$ between the adjacent pixels in the 90-degree direction, and calculate $E_{135}=|R_{(3i-2,3j-1)}-R_{(3i-1,3j)}|+|R_{(3i-1,3j)}-R_{(3i,3j+1)}|+|R_{(3i-1,3j-1)}-R_{(3i,3j)}|+|R_{(3i,3j)}-R_{(3i+1,3j+1)}|+|R_{(3i,3j-1)}-R_{(3i+1,3j)}|+|R_{(3i+1,3j)}-R_{(3i+2,3j+1)}|$ to obtain the difference value $E_{135}$ between the adjacent pixels in the 135-degree direction.

In some another embodiments, the direction detection circuit 1450 may use the green-color subpixel data of different pixels in the original image signal HR to calculate the difference values $E_0$, $E_{45}$, $E_{90}$ and $E_{135}$ between the adjacent pixels. For example, the direction detection circuit 1450 may calculate $E_0=|G_{(3i-1,3j-1)}-G_{(3i-1,3j)}|+|G_{(3i-1,3j)}-G_{(3i-1,3j+1)}|+|G_{(3i,3j-1)}-G_{(3i,3j)}|+|G_{(3i,3j)}-G_{(3i,3j+1)}|+|G_{(3i+1,3j-1)}-G_{(3i+1,3j)}|+|G_{(3i+1,3j)}-G_{(3i+1,3j+1)}|$ to obtain the difference value $E_0$ between the adjacent pixels in the 0-degree direction, calculate $E_{45}=|G_{(3i-2,3j+1)}-G_{(3i-1,3j)}|+|G_{(3i-1,3j)}-G_{(3i,3j-1)}|+|G_{(3i-1,3j+1)}-G_{(3i,3j)}|+|G_{(3i,3j)}-G_{(3i+1,3j-1)}|+|G_{(3i+1,3j-1)}-G_{(3i,3j+1)}|-G_{(3i+1,3j)}|+|G_{(3i+1,3j)}-G_{(3i+2,3j-1)}|$ to obtain the difference value $E_{45}$ between the adjacent pixels in the 45-degree direction, calculate $E_{90}=|G_{(3i-1,3j-1)}-G_{(3i,3j-1)}|+|G_{(3i,3j-1)}-G_{(3i+1,3j-1)}|+|G_{(3i-1,3j)}-G_{(3i,3j)}|+|G_{(3i,3j)}-G_{(3i+1,3j)}|+|G_{(3i-1,3j+1)}-G_{(3i,3j+1)}|+|G_{(3i,3j+1)}-G_{(3i+1,3j+1)}|$ to obtain the difference value $E_{90}$ between the adjacent pixels in the 90-degree direction, and calculate $E_{135}=|G_{(3i-2,3j-1)}-G_{(3i-1,3j)}|+|G_{(3i-1,3j)}-G_{(3i,3j+1)}|+|G_{(3i-1,3j-1)}-G_{(3i,3j)}|+|G_{(3i,3j)}-G_{(3i+1,3j+1)}|+|G_{(3i,3j-1)}-G_{(3i+1,3j)}|+|G_{(3i+1,3j)}-G_{(3i+2,3j+1)}|$ to obtain the difference value $E_{135}$ between the adjacent pixels in the 135-degree direction.

In some another embodiments, the direction detection circuit 1450 may use the blue-color subpixel data of different pixels in the original image signal HR to calculate the difference values $E_0$, $E_{45}$, $E_{90}$ and $E_{135}$ between the adjacent pixels. For example, the direction detection circuit 1450 may calculate $E_0=|B_{(3i-1,3j-1)}-B_{(3i-1,3j)}|+|B_{(3i-1,3j)}-B_{(3i-1,3j+1)}|+|B_{(3i,3j-1)}-B_{(3i,3j)}|+|B_{(3i,3j)}-B_{(3i,3j+1)}|+|B_{(3i+1,3j-1)}-B_{(3i+1,3j)}|+|B_{(3i+1,3j)}-B_{(3i+1,3j+1)}|$ to obtain the difference value $E_0$ between the adjacent pixels in the 0-degree direction, calculate $E_{45}=|B_{(3i-2,3j+1)}-B_{(3i-1,3j)}|+|B_{(3i-1,3j)}-B_{(3i,3j-1)}|+|B_{(3i-1,3j+1)}-B_{(3i,3j)}|+|B_{(3i,3j)}-B_{(3i+1,3j-1)}|+|B_{(3i,3j+1)}-B_{(3i+1,3j)}|+|B_{(3i+1,3j)}-B_{(3i+2,3j-1)}|$ to obtain the difference value $E_{45}$ between the adjacent pixels in the 45-degree direction, calculate $E_{90}=|B_{(3i-1,3j-1)}-B_{(3i,3j-1)}|+|B_{(3i,3j-1)}-B_{(3i+1,3j-1)}|+|B_{(3i-1,3j)}-B_{(3i,3j)}|+|B_{(3i,3j)}-B_{(3i+1,3j)}|+|B_{(3i-1,3j+1)}-B_{(3i,3j+1)}|+|B_{(3i,3j+1)}-B_{(3i+1,3j+1)}|$ to obtain the difference value $E_{90}$ between the adjacent pixels in the 90-degree direction, and calculate $E_{135}=|B_{(3i-2,3j-1)}-B_{(3i-1,3j)}|+|B_{(3i-1,3j)}-B_{(3i,3j+1)}|+|B_{(3i,3j-1)}-B_{(3i+1,3j)}|+|B_{(3i+1,3j)}-B_{(3i+2,3j+1)}|$ to obtain the difference value $E_{135}$ between the adjacent pixels in the 135-degree direction.

Referring to FIG. 14, when the detection result S output by the colorless detector 1340 is the second logic value (e.g., 0 or any other logic value), the one-directional downsampling circuit 210 and the multi-directional downsampling circuit 220 may determine the sampling direction according to the direction information Dir output by the direction detection circuit 1450. For example, with reference to FIG. 14, when the direction information Dir is set as 0 degree, the one-directional downsampling circuit 210 may select the corresponding subpixels from the original image signal HR according to the sampling direction shown in FIG. 6 to perform the filter operation (referring to the description related to the one-directional downsampling circuit 210 illustrated in FIG. 2), and the multi-directional downsampling circuit 220 may select the corresponding subpixels from the original image signal HR according to the sampling direction shown in FIG. 6 to perform the filter operation (referring to the description related to the multi-directional downsampling circuit 220 illustrated in FIG. 2). In another example, when the direction information Dir is set as 45 degrees, the one-directional downsampling circuit 210 and the multi-directional downsampling circuit 220 illustrated in FIG. 14 may select the corresponding subpixels from the original image signal HR according to the sampling direction shown in FIG. 7 to perform the filter operation. When the direction information Dir is set as 90 degrees, the one-directional downsampling circuit 210 and the multi-directional downsampling circuit 220 illustrated in FIG. 14 may select the corresponding subpixels from the original image signal HR according to the sampling direction shown in FIG. 8 to perform the filter operation. When the direction information Dir is set as 135 degrees, the one-directional downsampling circuit 210 and the multi-directional downsampling circuit 220 illustrated in FIG. 14 may select the corresponding subpixels from the original image signal HR according to the sampling direction shown in FIG. 9 to perforin the filter operation.

Figure 15:
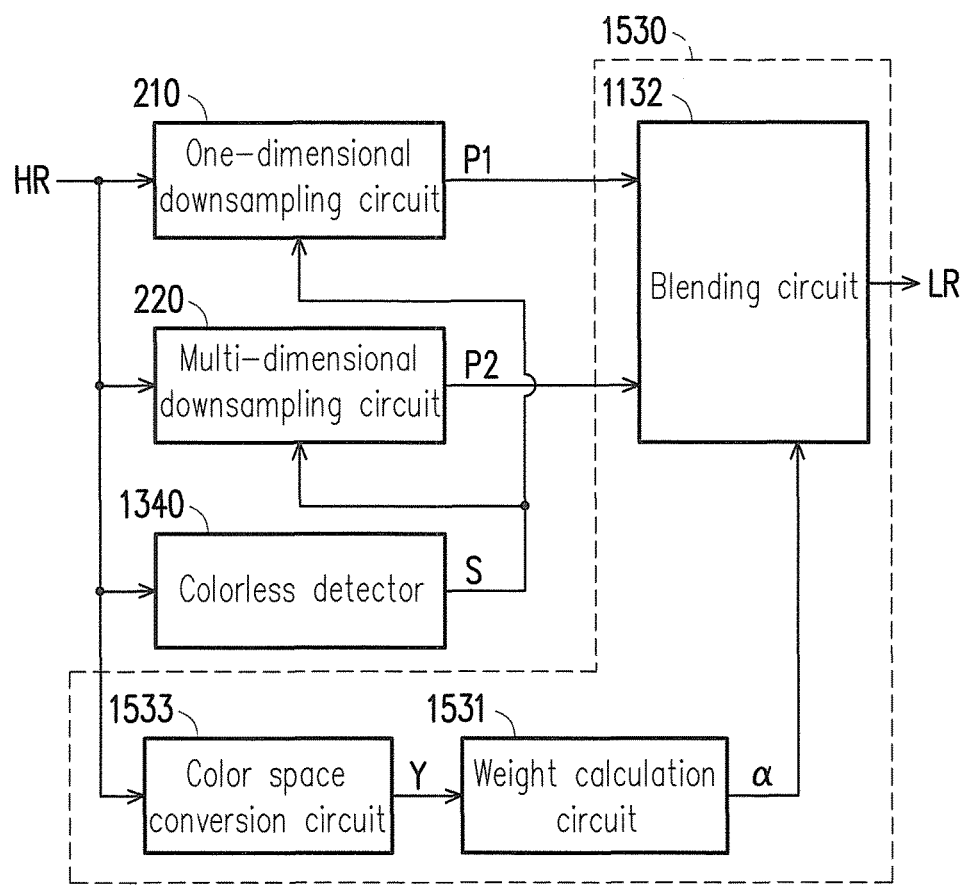
FIG. 15 is a schematic diagram of an image downsampling apparatus according to another embodiment of the invention.

FIG. 15 is a schematic diagram of an image downsampling apparatus 1500 according to another embodiment of the invention. The image downsampling apparatus 1500 includes a one-dimensional downsampling circuit 210, a multi-dimensional downsampling circuit 220, a colorless detection circuit 1340 and an output circuit 1530. The embodiment illustrated in FIG. 15 may be inferred with reference to the description related to the embodiments illustrated in FIG. 13. In the embodiment illustrated in FIG. 15, the output circuit 1530 includes a color space conversion circuit 1530, a weight calculation circuit 1531 and a blending circuit 1132. The color space conversion circuit 1533 receives the original image signal HR and converts the original image signal HR into a luminance signal Y. For example (but not limited to) the color space conversion circuit 1533 may calculate a formula, Y=0.299*R+0.587*G+0.114*B to convert red-color subpixel data R, green-color subpixel data G and blue-color subpixel data B of the original image signal HR into the luminance signal Y.

The weight calculation circuit 1531 is coupled to the color space conversion circuit 1533 to receive the luminance signal Y and calculates a weight value α by using the luminance signal Y. For example, the weight calculation circuit 1531 may perform a Gaussian filtering operation on the luminance signal Y to obtain a plurality of first weights W corresponding to different pixel positions. An algorithm for the Gaussian filter operation may be determined based on design requirements. In some embodiments, the Gaussian filter operation includes calculating $$W_{(x,y)} = \frac{1}{\sigma^2}\left(\frac{x^2+y^2}{\sigma^2} - 2\right)e^{\frac{-(x^2+y^2)}{2\sigma^2}} * Y_{(x,y)},$$

where $W_{(x,y)}$ is a first weight W corresponding to a pixel coordinate (x,y) in the original image signal HR, G is a real number and may be determined based on design requirements, such as 0.8 or any other real number, and $Y_{(x,y)}$ is luminance data of the pixel coordinate (x,y) in the luminance signal Y.

The weight calculation circuit 1531 converts the plurality of first weights W into a plurality of second weights f(W) according to a conversion curve f. The conversion curve f may be determined based on design requirements. For example, the weight calculation circuit 1531 may converts different first weights W into the second weights f(W) according to the conversion curve f in FIG. 12. After the conversion, the weight calculation circuit 1531 obtains the weight value α according to at least one of the plurality of second weights f(W). For example, the weight calculation circuit 1531 may select the maximum among the second weights f(W) to serve it as the weight value, while in other embodiments, the weight calculation circuit 1531 may calculate the weight value α from the second weights f(W) by using another algorithm. For example, the weight calculation circuit 1531 may calculate an average of the second weights f(W) and serve it as the weight value α.

The blending circuit 1132 illustrated in FIG. 15 may be inferred with reference to the description related to the blending circuit 1132 illustrated in FIG. 13. The blending circuit 1032 may determine a component ratio of the first adjusted image signal P1 to the second adjusted image signal P2 in the downsampled image signal LR according to the weight value α. For example, the blending circuit 1132 may calculate a formula, LR=α*P2+(1−α)*P1, where 0≤α≤1.

Figure 16:
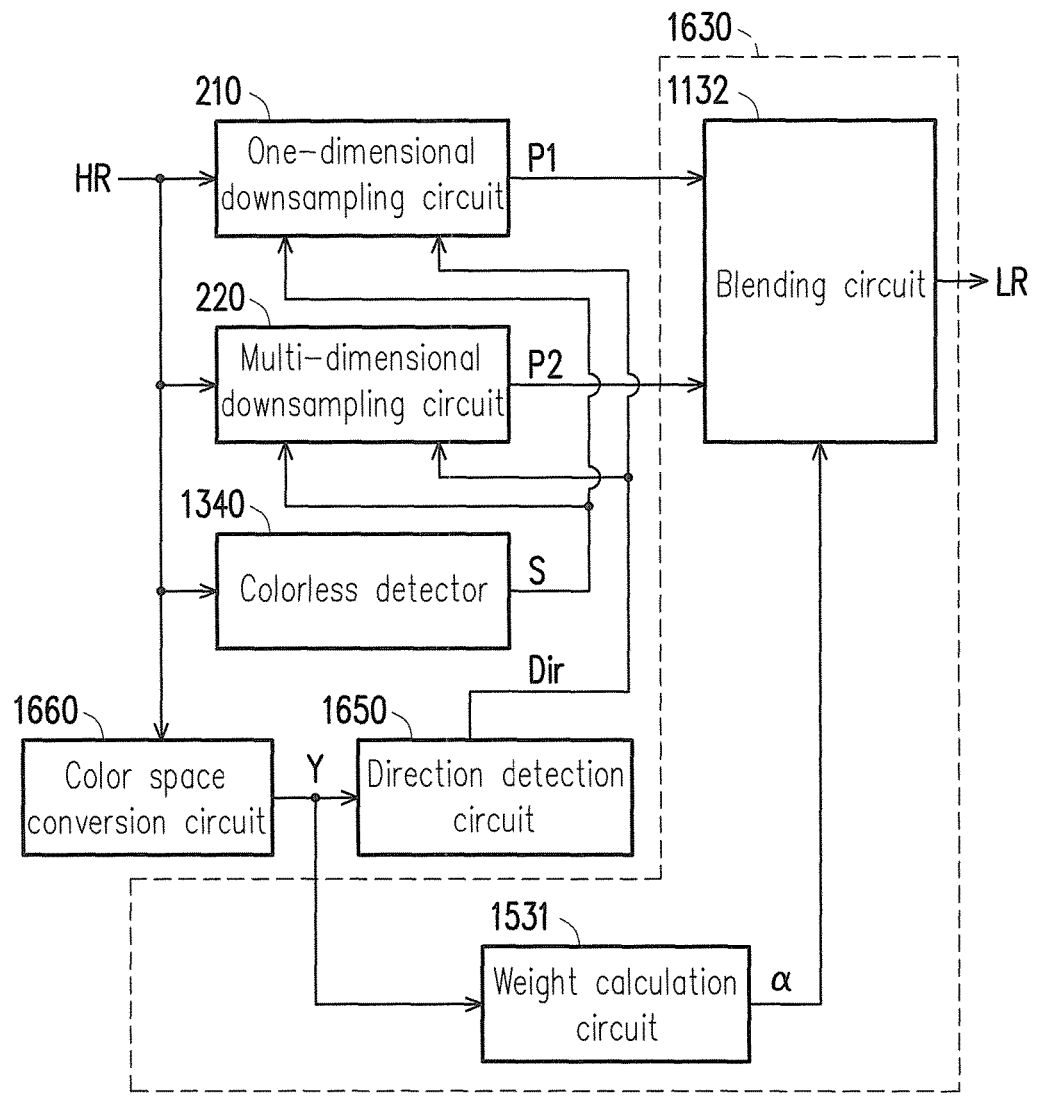
FIG. 16 is a schematic diagram of an image downsampling apparatus according to yet another embodiment of the invention.

FIG. 16 is a schematic diagram of an image downsampling apparatus 1600 according to yet another embodiment of the invention. The image downsampling apparatus 1600 includes a one-dimensional downsampling circuit 210, a multi-dimensional downsampling circuit 220, an output circuit 1630, a colorless detector 1340, a color space conversion circuit 1660 and a direction detection circuit 1650. The embodiment illustrated in FIG. 16 may be inferred with reference to the descriptions related to the embodiments illustrated in FIG. 14 and FIG. 15. In the embodiment illustrated in FIG. 16, the space color conversion circuit 1660 receives the original image signal HR and converts the original image signal HR into a luminance signal Y. For example (but not limited to), the color space conversion circuit 1660 may calculate a formula, Y=0.299*R+0.587*G+0.114*B, to convert red-color subpixel data R, green-color subpixel data G and blue-color subpixel data B of the original image signal HR into the luminance signal Y.

The direction detection circuit 1650 is coupled to the color space conversion circuit 1660 to receive the luminance signal Y and performs the direction detection by using the luminance signal Y to obtain the direction information Dir and output the direction information Dir to the one-directional downsampling circuit 210, the multi-directional downsampling circuit 220 and the output circuit 1630. The direction detection circuit 1650 calculates a difference values between each adjacent pixels in different directions and determines the direction information Dir according to the difference values between the adjacent pixels. For example, the direction detection circuit 1650 may calculate a difference value $E_0$ between each adjacent pixels in the 0-degree direction, a difference value $E_{45}$ between each adjacent pixels in the 45-degree direction, a difference value $E_{90}$ between each adjacent pixels in the 90-degree direction, and a difference value $E_{135}$ between each adjacent pixels in the 135-degree direction.

In some embodiments, the direction detection circuit 1650 may use luminance data of different pixels of the luminance signal Y to calculate the difference values $E_0$, $E_{45}$, $E_{90}$ and $E_{135}$ between the adjacent pixels. For example, the direction detection circuit 1650 may calculate $E_0 = |Y_{(3i-1,3j-1)} - Y_{(3i-1,3j)}| + |Y_{(3i-1,3j)} - Y_{(3i-1,3j+1)}| + |Y_{(3i,3j-1)} - Y_{(3i,3j)}| + |Y_{(3i,3j)} - Y_{(3i,3j+1)}| + |Y_{(3i+1,3j-1)} - Y_{(3i+1,3j)}| + |Y_{(3i+1,3j)} - Y_{(3i+1,3j+1)}|$ to obtain the difference value $E_0$ between the adjacent pixels in the 0-degree direction, calculate $E_{45} = |Y_{(3i-2,3j+1)} - Y_{(3i-1,3j)}| + |Y_{(3i-1,3j)} - Y_{(3i,3j-1)}| + |Y_{(3i-1,3j+1)} - Y_{(3i,3j)}| + |Y_{(3i,3j)} - Y_{(3i+1,3j-1)}| + |Y_{(3i,3j+1)} - Y_{(3i+1,3j)}| + |Y_{(3i+1,3j)} - Y_{(3i+2,3j-1)}|$ to obtain the difference value $E_{45}$ between the adjacent pixels in the 45-degree direction, calculate $E_{90} = |Y_{(3i-1,3j-1)} - Y_{(3i,3j-1)}| + |Y_{(3i,3j-1)} - Y_{(3i+1,3j-1)}| + |Y_{(3i-1,3j)} - Y_{(3i,3j)}| + |Y_{(3i,3j)} - Y_{(3i+1,3j)}| + |Y_{(3i-1,3j+1)} - Y_{(3i,3j+1)}| + |Y_{(3i,3j+1)} - Y_{(3i+1,3j+1)}|$ to obtain the difference value $E_{90}$ between the adjacent pixels in the 90-degree direction, and calculate $E_{135} = |Y_{(3i-2,3j-1)} - Y_{(3i-1,3j)}| + |Y_{(3i-1,3j)} - Y_{(3i,3j+1)}| + |Y_{(3i-1,3j-1)} - Y_{(3i,3j)}| + +Y_{(3i,3j)} - Y_{(3i+1,3j+1)}| + |Y_{(3i,3j-1)} - Y_{(3i+1,3j)}| + |Y_{(3i-1,3j)} - Y_{(3i+2,3j+1)}|$ to obtain the difference value $E_{135}$ between the adjacent pixels in the 135-degree direction.

Referring to FIG. 16, after the difference values $E_0$, $E_{45}$, $E_{90}$ and $E_{135}$ between the adjacent pixels in different directions are obtained, the direction detection circuit 1650 may determine the direction information Dir according to the difference values $E_0$, $E_{45}$, $E_{90}$ and $E_{135}$ between the adjacent pixels. For example, the direction detection circuit 1650 may determine the direction information Dir according to the maximum among the difference values $E_0$, $E_{45}$, $E_{90}$ and $E_{135}$ between the adjacent pixels. For example, if the difference value $E_0$ in the 0-degree direction is the maximum among the difference values $E_0$, $E_{45}$, $E_{90}$ and $E_{135}$ between the adjacent pixels, the direction information Dir is set as 90 degrees. If the difference value $E_{45}$ in the 45-degree direction is the maximum among the difference values $E_0$, $E_{45}$, $E_{90}$ and $E_{135}$ between the adjacent pixels, the direction information Dir is set as 135 degrees. If the difference value $E_{90}$ in the 90-degree direction is the maximum among the difference values $E_0$, $E_{45}$, $E_{90}$ and $E_{135}$ between the adjacent pixels, the direction information Dir is set as 0 degrees. If the difference value $E_{135}$ in the 135-degree direction is the maximum among the difference values $E_0$, $E_{45}$, $E_{90}$ and $E_{135}$ between the adjacent pixels, the direction information Dir is set as 45 degrees.

The direction information Dir controls and determines the sampling direction of the one-directional downsampling circuit 210 and the multi-directional downsampling circuit 220. Operations of the one-directional downsampling circuit 210 and the multi-directional downsampling circuit 220 illustrated in FIG. 16 may be deduced with reference to the descriptions related to the one-directional downsampling circuit 210 and the multi-directional downsampling circuit 220 illustrated in FIG. 14 and thus, will not be repeated hereinafter.

In FIG. 16, the output circuit 1630 includes a weight calculation circuit 1531 and a blending circuit 1132. The weight calculation circuit 1531 is coupled to an output terminal of the color space conversion circuit 1660 to receive the luminance signal Y and calculates the weight value α by using the luminance signal Y. The weight calculation circuit 1531 and the blending circuit 1132 illustrated in FIG. 16 may be deduced with reference to the descriptions related to the weight calculation circuit 1531 and the blending circuit 1132 illustrated in FIG. 15 and thus, will not be repeated hereinafter.

Figure 17:
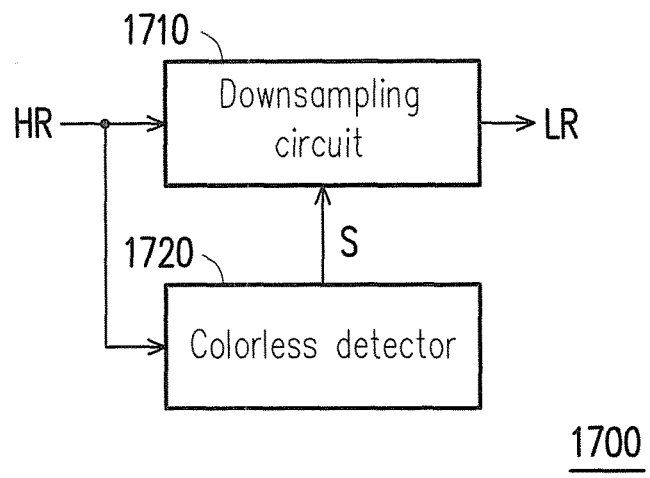
FIG. 17 is a schematic diagram of an image downsampling apparatus according to another embodiment of the invention.

FIG. 17 is a schematic diagram of an image downsampling apparatus 1700 according to another embodiment of the invention. The image downsampling apparatus 1700 includes a downsampling circuit 1710 and a colorless detector 1720. The image downsampling apparatus 1700 serves to perform an image downsampling method below. The colorless detector 1720 receives an original image signal HR and performs colorless detection by using the original image signal HR to obtain and output a detection result S. The colorless detector 1720 illustrated in FIG. 17 may be inferred with reference to the description related to the colorless detector 1340 illustrated in FIG. 13 and thus, will not be repeatedly described.

In FIG. 17, the downsampling circuit 1710 receives the original image signal HR and performs downsampling by using the original image signal HR to obtain and output a downsampled image signal LR, where a resolution of the downsampled image signal LR is less than the resolution of the original image signal HR (which can be inferred according to the description with respect to FIG. 1). In some embodiments, the downsampling circuit 1710 may be the one-directional downsampling circuit 210 illustrated in FIG. 4 or the one-directional downsampling circuit 210 illustrated in FIG. 13. The one-directional downsampling circuit 1710 receives the original image signal HR and performs the one-directional downsampling by using the original image signal HR to obtain and output the downsampled image signal LR. In some embodiments, the downsampling circuit 1710 may be the multi-directional downsampling circuit 220 illustrated in FIG. 4 or the multi-directional downsampling circuit 220 illustrated in FIG. 13. The multi-directional downsampling circuit 1710 receives the original image signal HR and performs the multi-directional downsampling by using the original image signal HR to obtain and output the downsampled image signal LR.

When the detection result S is a first logic value (e.g., 1 or any other logic value), the downsampling circuit 1710 performs the downsampling according to red-color data $R_{(a*i,a*j)}$, green-color data $G_{(a*i,a*j)}$ and blue-color data $B_{(a*i,a*j)}$ of a corresponding pixel of the original image signal HR to obtain red-color subpixel data $r_{(i,j)}$, green-color subpixel data $g_{(i,j)}$ and blue-color subpixel data $b_{(i,j)}$ located in a pixel coordinate (i,j) in the downsampled image signal LR, where a is an integer and may be determined based on design requirements. In some embodiments, a may be 3 (which can be inferred according to the description with respect to FIG. 1). For example, referring to FIG. 5 and FIG. 17, when the detection result S is the logic value of 1, the downsampling circuit 1710 may respectively select red-color data $R_{(3i,3j)}$, green-color data $G_{(3i,3j)}$ and blue-color data $B_{(3i,3j)}$ corresponding to a pixel position (3i,3j) from the original image signal HR to perform the downsampling to obtain red-color subpixel data $r_{(i,j)}$, green-color subpixel data $g_{(i,j)}$ and blue-color subpixel data $b_{(i,j)}$ located in the pixel coordinate (i,j) in the downsampled image signal LR.

When the detection result S is a second logic value (e.g., 0 or any other logic value), the downsampling circuit 1710 selects red-color data of a first corresponding pixel, green-color data of a second corresponding pixel and blue-color data of a third corresponding pixel from the original image signal according to a sampling direction to perform the downsampling to obtain red-color subpixel data $r_{(i,j)}$, green-color subpixel data $g_{(i,j)}$ and blue-color subpixel data $b_{(i,j)}$ located in the pixel coordinate (i,j) in the downsampled image signal LR. One of the first corresponding pixel, the second corresponding pixel and the third corresponding pixel has a pixel coordinate (a*i,a*j) in the original image signal HR.

For example, the sampling direction may be a 0-degree direction (a horizontal direction, a column direction or a row direction), and a may be 3. When the detection result S is the logic value of 0, the downsampling circuit 1710 may respectively select red-color data $R_{(3i,3j-1)}$ of a pixel (3i,3j−1), green-color data $G_{(3i,3j)}$ of a pixel (3i,3j) and blue-color data $B_{(3i,3j+1)}$ of a pixel (3i,3j+1) from the original image signal HR in the 0-degree direction (as shown in FIG. 6) to perform a filter operation to obtain red-color subpixel data $r_{(i,j)}$, green-color subpixel data $g_{(i,j)}$ and blue-color subpixel data $b_{(i,j)}$ located in the pixel coordinate (i,j) in the downsampled image signal LR.

In another example, the sampling direction may be a 45-degree direction, and a may be 3. When the detection result S is the logic value of 0, the downsampling circuit 1710 may respectively select red-color data $R_{(3i+1,3j-1)}$ of a pixel (3i+1,3j−1), the green-color data $G_{(3i,3j)}$ of the pixel (3i,3j) and blue-color data $B_{(3i-1,3j+1)}$ of a pixel (3i−1,3j+1) from the original image signal HR according to the 45-degree direction (as shown in FIG. 7) to perform the filter operation to obtain the red-color subpixel data $r_{(i,j)}$, the green-color subpixel data $g_{(i,j)}$ and the blue-color subpixel data $b_{(i,j)}$ located in the pixel coordinate (i,j) in the downsampled image signal LR.

In yet another example, the direction may be a 90-degree direction (a vertical direction, a row direction or a column direction), and a may be 3. When the detection result S is the logic value of 0, the downsampling circuit 1710 may respectively select red-color data $R_{(3i+1,3j)}$ of a pixel (3i+1,3j), the green-color data $G_{(3i,3j)}$ of the pixel (3i,3j) and blue-color data $B_{(3i-1,3j)}$ of a pixel (3i−1,3j) from the original image signal HR according to the 90-degree direction (as shown in FIG. 8) to perform the filter operation to obtain the red-color subpixel data $r_{(i,j)}$, the green-color subpixel data $g_{(i,j)}$ and the blue-color subpixel data $b_{(i,j)}$ located in the pixel coordinate (i,j) in the downsampled image signal LR.

In further another example, the direction may be a 135-degree direction, and a may be 3. When the detection result S is the logic value of 0, the downsampling circuit 1710 may respectively select red-color data $R_{(3i-1,3j-1)}$ of a pixel (3i−1,3j−1), the green-color data $G_{(-1,3i,3j)}$ of the pixel (3i,3j) and blue-color data $B_{(3i+1,3j+1)}$ of a pixel (3i+1,3j−1) from the original image signal HR according to the 135-degree direction (as shown in FIG. 9) to perform the filter operation to obtain the red-color subpixel data $r_{(i,j)}$, the green-color subpixel data $g_{(i,j)}$ and the blue-color subpixel data $b_{(i,j)}$ located in the pixel coordinate (i,j) in the downsampled image signal LR.

The colorless detector 1720 may perform the colorless detection on the original image signal HR and correspondingly outputs the detection result S. The downsampling circuit 1710 may adaptively determine/change the selection of the subpixels during the downsampling process according to the detection result S. Thus, the image downsampling apparatus and the image downsampling method of the present embodiment can contribute to mitigating the issues of line-broken and color fringing artifact and reducing the sharpness loss.

Figure 18:
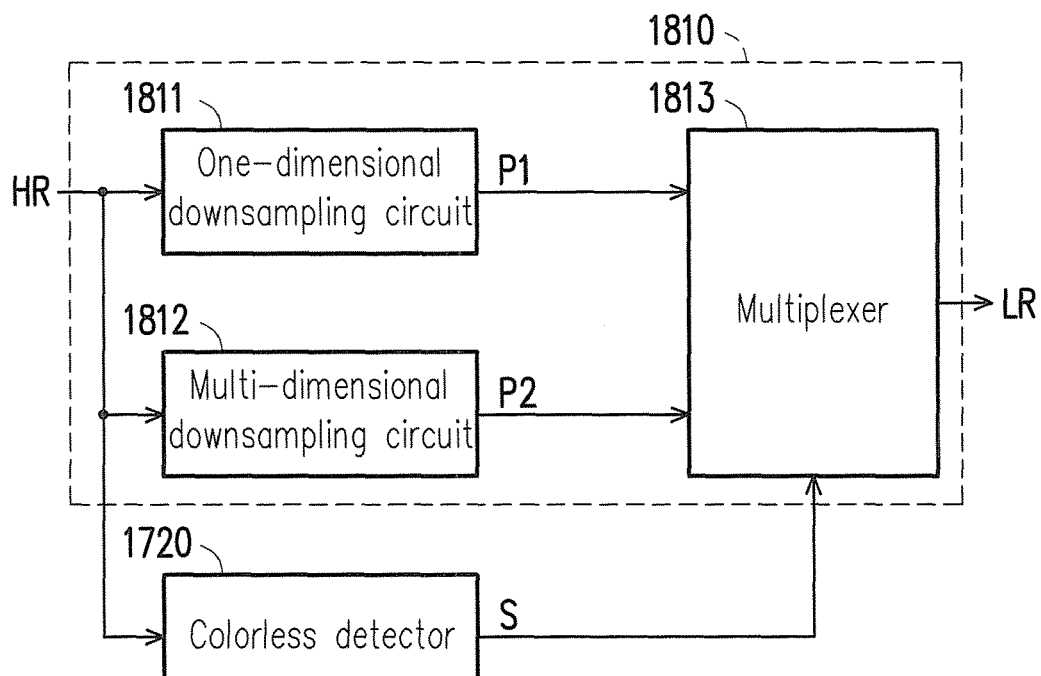
FIG. 18 is a schematic diagram of an image downsampling apparatus according to still another embodiment of the invention.

FIG. 18 is a schematic diagram of an image downsampling apparatus 1800 according to yet another embodiment of the invention. The image downsampling apparatus 1800 includes a downsampling circuit 1810 and a colorless detector 1720. The downsampling circuit 1810 and the colorless detector 1720 illustrated in FIG. 18 may be inferred with reference to the descriptions related to the downsampling circuit 1710 and the colorless detector 1720 illustrated in FIG. 17. In the embodiment illustrated in FIG. 18, the downsampling circuit 1810 includes a one-dimensional downsampling circuit 1811, a multi-dimensional downsampling circuit 1812 and a multiplexer 1813. The one-directional downsampling circuit 1811, the multi-directional downsampling circuit 1812, the multiplexer 1813 and the colorless detector 1720 illustrated in FIG. 18 may be deduced with reference to the descriptions related to the one-directional downsampling circuit 210 and the multi-directional downsampling circuit 220, the multiplexer 332 and the colorless detector 331 illustrated in FIG. 3 and thus, will not be repeated hereinafter.

Figure 19:
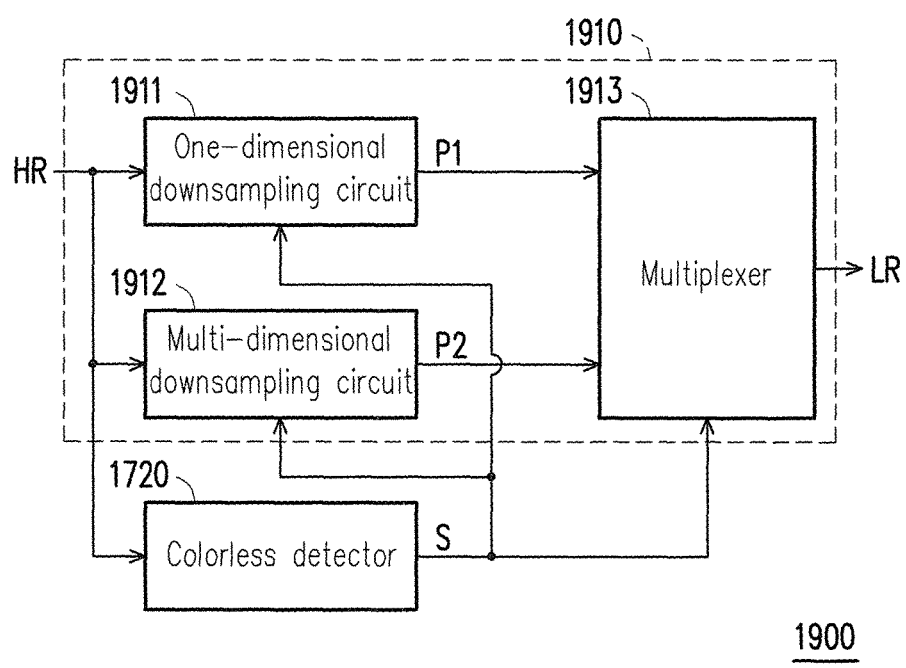
FIG. 19 is a schematic diagram of an image downsampling apparatus according to further another embodiment of the invention.

FIG. 19 is a schematic diagram of an image downsampling apparatus 1900 according to further another embodiment of the invention. The image downsampling apparatus 1900 includes a downsampling circuit 1910 and a colorless detector 1720. The downsampling circuit 1910 and the colorless detector 1720 illustrated in FIG. 19 may be inferred with reference to the descriptions related to the downsampling circuit 1810 and the colorless detector 1720 illustrated in FIG. 18. The downsampling circuit 1910 includes a one-dimensional downsampling circuit 1911, a multi-dimensional downsampling circuit 1912 and a multiplexer 1913. In the embodiment illustrated in FIG. 19, the one-directional downsampling circuit 1911 and the multi-directional downsampling circuit 230 are further coupled to an output terminal of the colorless detector 1720 to receive a detection result S. The one-directional downsampling circuit 1911, the multi-directional downsampling circuit 1912, the multiplexer 1913 and the colorless detector 1720 illustrated in FIG. 19 may be deduced with reference to the descriptions related to the one-directional downsampling circuit 210 and the multi-directional downsampling circuit 220, the multiplexer 332 and the colorless detector 331 illustrated in FIG. 4 and thus, will not be repeated hereinafter.

Figure 20:
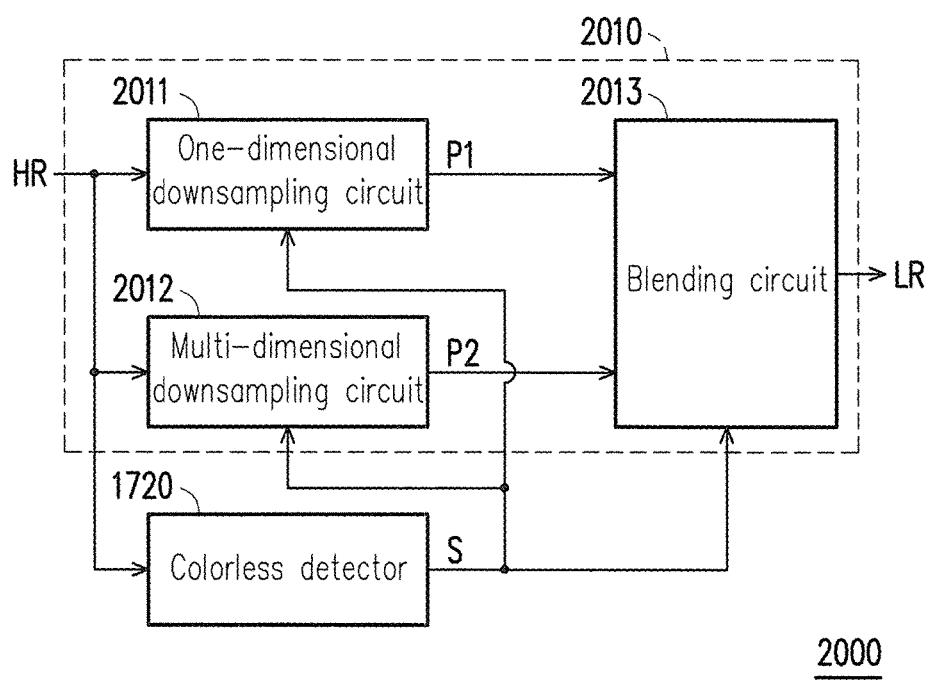
FIG. 20 is a schematic diagram of an image downsampling apparatus according to yet another embodiment of the invention.

FIG. 20 is a schematic diagram of an image downsampling apparatus 2000 according to yet another embodiment of the invention. The image downsampling apparatus 2000 includes a downsampling circuit 2010 and a colorless detector 1720. The downsampling circuit 2010 and the colorless detector 1720 illustrated in FIG. 20 may be inferred with reference to the descriptions related to the downsampling circuit 1910 and the colorless detector 1720 illustrated in FIG. 19. The image downsampling apparatus 2010 illustrated in FIG. 20 includes a one-dimensional downsampling circuit 2011, a multi-dimensional downsampling circuit 2012 and a blending circuit 2013. The one-directional downsampling circuit 2011, the multi-directional downsampling circuit 2012, the blending circuit 2013 and the colorless detector 1720 illustrated in FIG. 20 may be deduced with reference to the descriptions related to the one-directional downsampling circuit 210 and the multi-directional downsampling circuit 220, the blending circuit 1032 and the colorless detector 331 illustrated in FIG. 10 and thus, will not be repeated hereinafter.

Figure 21:
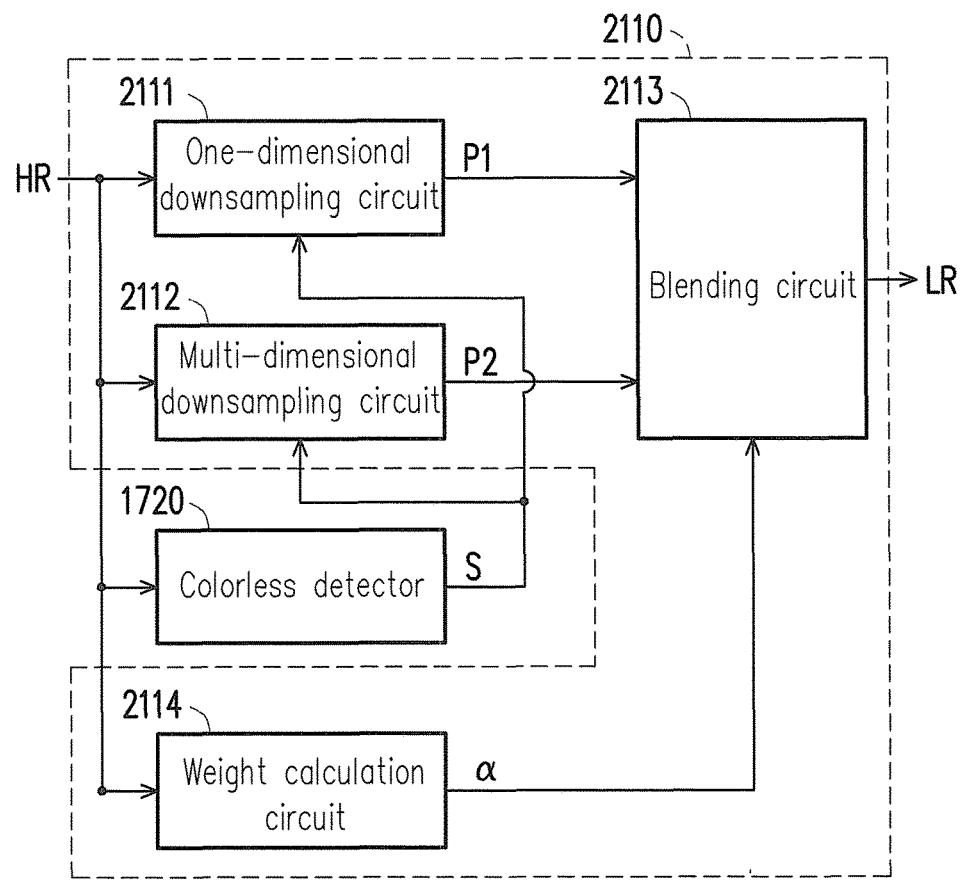
FIG. 21 is a schematic diagram of an image downsampling apparatus according to another embodiment of the invention.

FIG. 21 is a schematic diagram of an image downsampling apparatus 2100 according to another embodiment of the invention. The image downsampling apparatus 2100 includes a downsampling circuit 2110 and a colorless detector 1720. The downsampling circuit 2110 and the colorless detector 1720 illustrated in FIG. 21 may be inferred with reference to the descriptions related to the downsampling circuit 2010 and the colorless detector 1720 illustrated in FIG. 20. The downsampling circuit 2110 illustrated in FIG. 21 includes a one-dimensional downsampling circuit 2111, a multi-dimensional downsampling circuit 2112, a blending circuit 2114 and a weight calculation circuit 2114. The one-directional downsampling circuit 2111, the multi-directional downsampling circuit 2112, the blending circuit 2113 and the weight calculation circuit 2114 illustrated in FIG. 21 may be deduced with reference to the descriptions related to the one-directional downsampling circuit 210, the multi-directional downsampling circuit 220, the blending circuit 1132 and the weight calculation circuit 1131 illustrated in FIG. 13 and thus, will not be repeated hereinafter.

Figure 22:
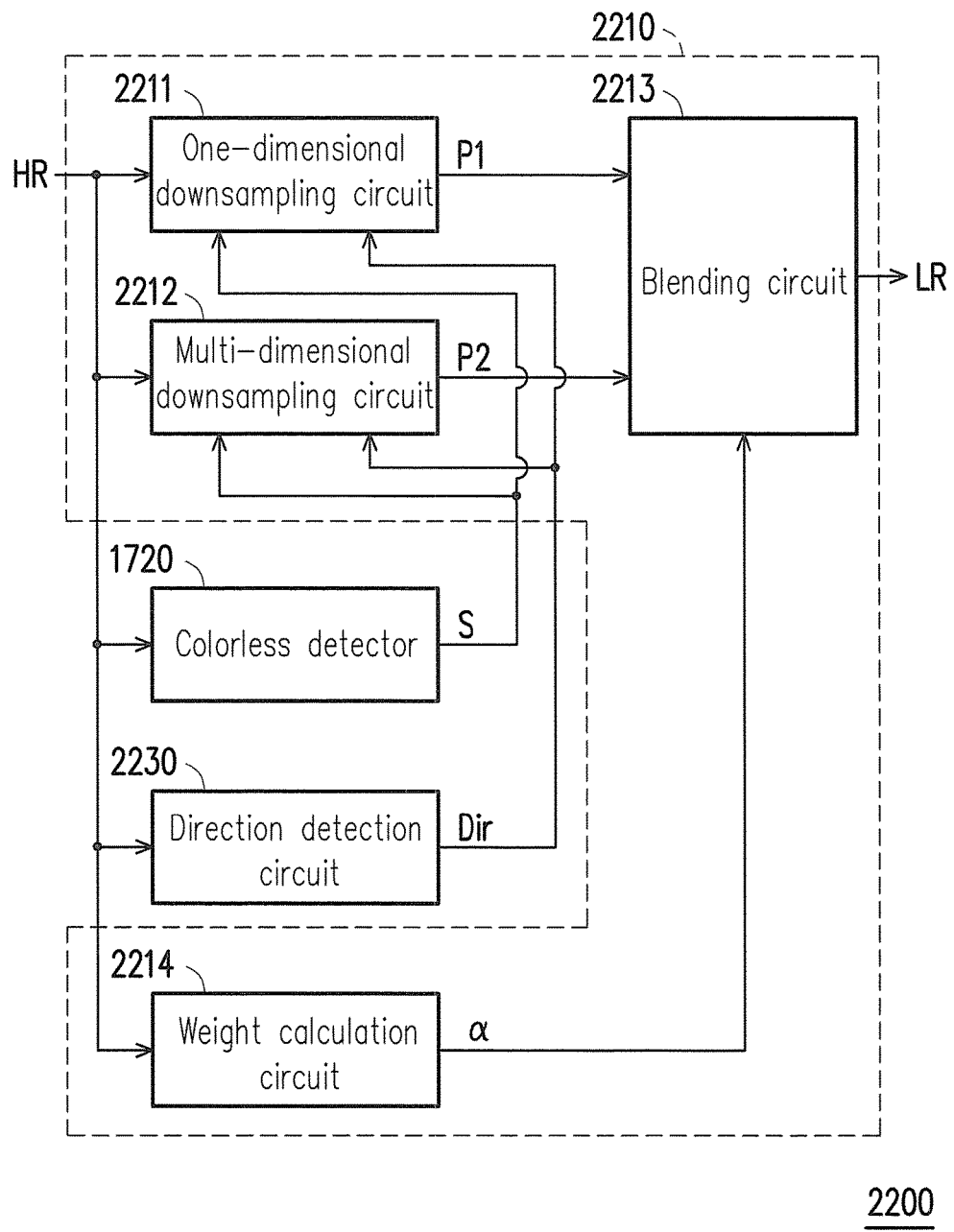
FIG. 22 is a schematic diagram of an image downsampling apparatus according to another embodiment of the invention.

FIG. 22 is a schematic diagram of an image downsampling apparatus 2200 according to another embodiment of the invention. The image downsampling apparatus 2200 includes a downsampling circuit 2210, a colorless detector 1720 and a direction detection circuit 2230. The downsampling circuit 2210 and the colorless detector 1720 illustrated in FIG. 22 may be inferred with reference to the descriptions related to the downsampling circuit 2110 and the colorless detector 1720 illustrated in FIG. 21. The image downsampling apparatus 2210 illustrated in FIG. 22 includes a one-dimensional downsampling circuit 2211, a multi-dimensional downsampling circuit 2212, a blending circuit 2213 and a weight calculation circuit 2214. The one-directional downsampling circuit 2211, the multi-directional downsampling circuit 2212, the blending circuit 2213, the weight calculation circuit 2114 and the direction detection circuit 2230 illustrated in FIG. 22 may be deduced with reference to the descriptions related to the one-directional downsampling circuit 210 and the multi-directional downsampling circuit 220, the blending circuit 1132, the weight calculation circuit 1131 and the direction detection circuit 1450 illustrated in FIG. 14 and thus, will not be repeated hereinafter.

Figure 23:
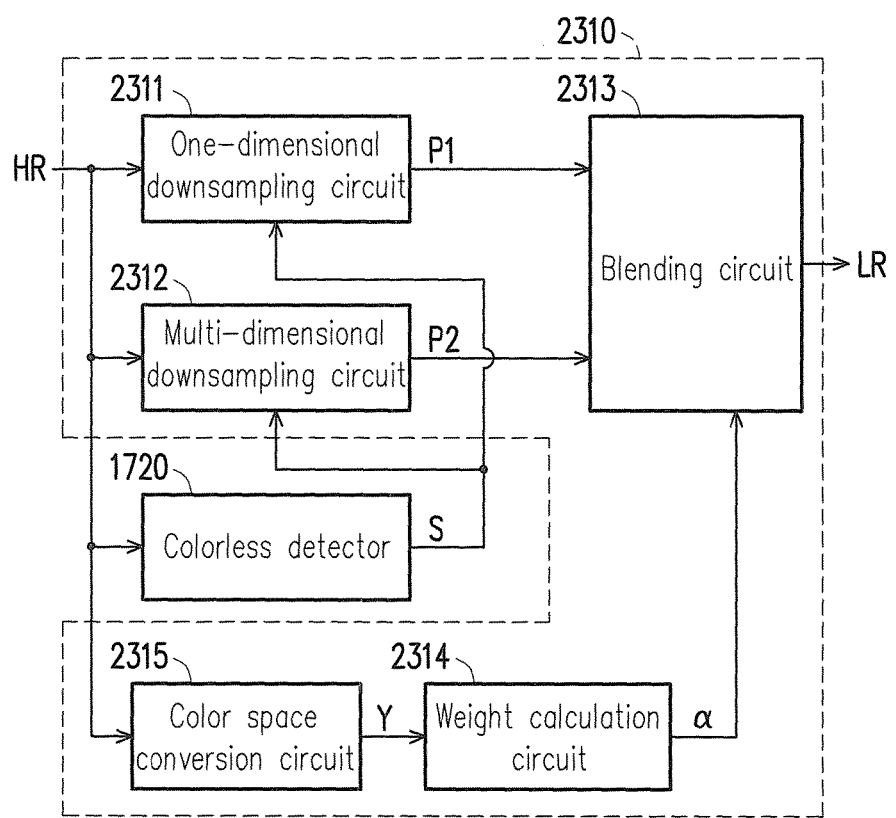
FIG. 23 is a schematic diagram of an image downsampling apparatus according to yet another embodiment of the invention.

FIG. 23 is a schematic diagram of an image downsampling apparatus 2300 according to yet another embodiment of the invention. The image downsampling apparatus 2300 includes a downsampling circuit 2310 and a colorless detector 1720. The downsampling circuit 2310 and the colorless detector 1720 illustrated in FIG. 23 may be inferred with reference to the descriptions related to the downsampling circuit 2110 and the colorless detector 1720 illustrated in FIG. 21. The downsampling circuit 2310 illustrated in FIG. 23 includes a one-dimensional downsampling circuit 2311, a multi-dimensional downsampling circuit 2312, a blending circuit 2313, a weight calculation circuit 2314 and a color space conversion circuit 2315. The one-directional downsampling circuit 2311, the multi-directional downsampling circuit 2312, the blending circuit 2313, the weight calculation circuit 2314 and the color space conversion circuit 2315 illustrated in FIG. 23 may be deduced with reference to the descriptions related to the one-directional downsampling circuit 210, the multi-directional downsampling circuit 220, the blending circuit 1132, the weight calculation circuit 1531 and the color space conversion circuit 1533 illustrated in FIG. 15 and thus, will not be repeated hereinafter.

Figure 24:
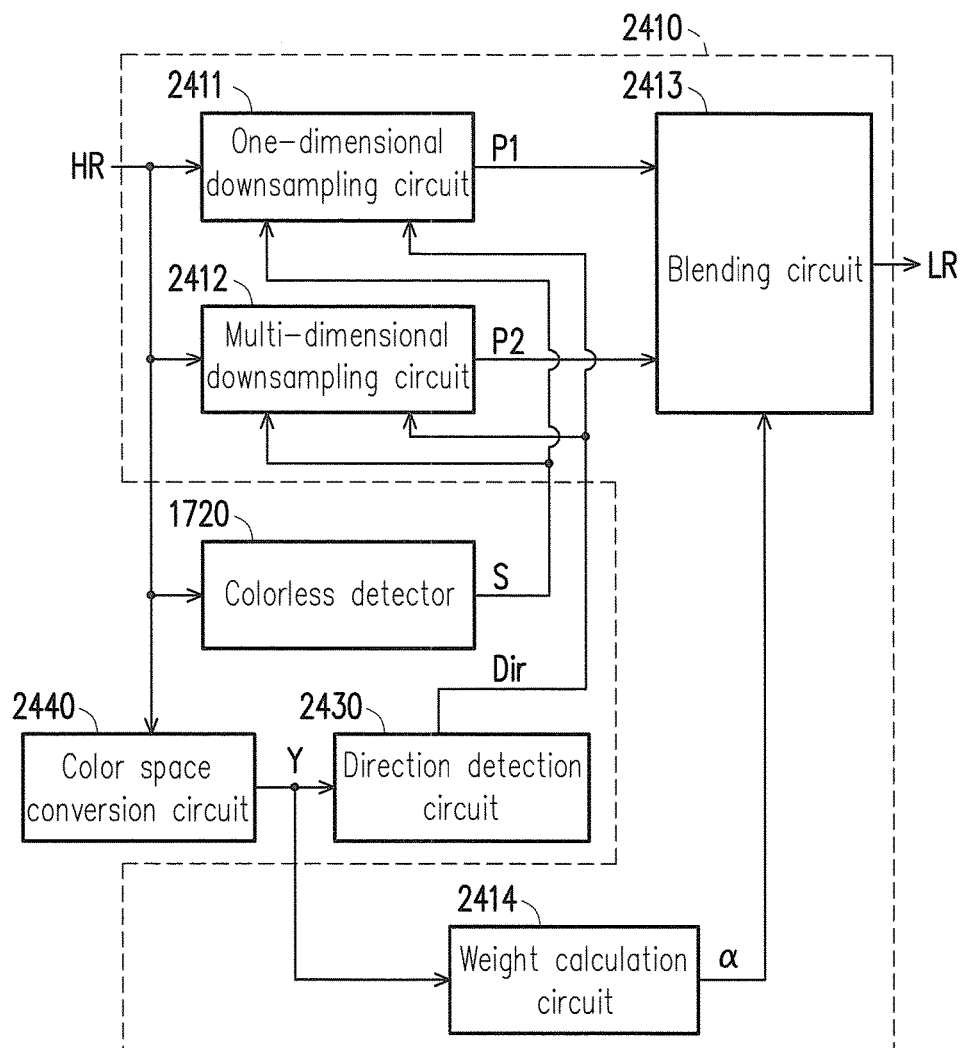
FIG. 24 is a schematic diagram of an image downsampling apparatus according to yet another embodiment of the invention.

FIG. 24 is a schematic diagram of an image downsampling apparatus 2400 according to yet another embodiment of the invention. The image downsampling apparatus 2400 includes a downsampling circuit 2410, a colorless detector 1720, a color space conversion circuit 2440 and a direction detection circuit 2430. The downsampling circuit 2410 and the colorless detector 1720 illustrated in FIG. 24 may be inferred with reference to the descriptions related to the downsampling circuit 2210 and the colorless detector 1720 illustrated in FIG. 22. The downsampling circuit 2410 illustrated in FIG. 24 includes a one-dimensional downsampling circuit 2411, a multi-dimensional downsampling circuit 2412, a blending circuit 2413 and a weight calculation circuit 2414. The one-directional downsampling circuit 2411, the multi-directional downsampling circuit 2412, the blending circuit 2413, the weight calculation circuit 2414, the color space conversion circuit 2440 and the direction detection circuit 2430 illustrated in FIG. 24 may be deduced with reference to the descriptions related to the one-directional downsampling circuit 210 and the multi-directional downsampling circuit 220, the blending circuit 1132, the weight calculation circuit 1531, the color space conversion circuit 1660 and the direction detection circuit 1650 illustrated in FIG. 16 and thus, will not be repeated hereinafter.

Based on the above, in part of the embodiments of the invention, the component of the downsampled image signal LR can selectively contain the first adjusted image signal P1 and/or the second adjusted image signal P2, and thus, the image downsampling apparatus and the image downsampling method of the embodiments of the invention can adaptively contribute to mitigating the issues of line-broken and color fringing artifact and reducing the sharpness loss. In another part of the embodiments of the invention, the colorless detector can perform the colorless detection on the original image signal HR and correspondingly output the detection result S, and the downsampling circuit can adaptively determine/change the selection of the subpixels during the downsampling process according to the detection result S. Thus, the image downsampling apparatus and the image downsampling method of the embodiments of the invention can contribute to mitigating the issues of line-broken and color fringing artifact and reducing the sharpness loss.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. An image downsampling apparatus, comprising:
   a one-directional downsampling circuit, receiving an original image signal and performing one-direction downsampling by using the original image signal to obtain and output a first adjusted image signal, wherein a resolution of the first adjusted image signal is less than a resolution of the original image signal;
   a multi-directional downsampling circuit, receiving the original image signal and performing multi-direction downsampling by using the original image signal to obtain and output a second adjusted image signal, wherein a resolution of the second adjusted image signal is less than the resolution of the original image signal; and
   an output circuit, coupled to an output terminal of the one-directional downsampling circuit and an output terminal of the multi-directional downsampling circuit, wherein the output circuit outputs a downsampled image signal according to the first adjusted image signal and the second adjusted image signal by calculating data of each pixel of one or more pixels of the downsampled image signal as a mixed value of both data of one corresponding pixel at the same position of the first adjusted image signal and data of one corresponding pixel at the same position of the second adjusted image signal.

2. The image downsampling apparatus according to claim 1, wherein the one-directional downsampling circuit selects one corresponding subpixel data from a plurality of subpixel data of the original image signal and calculates $$P1_{(i,j)} = \sum_{k=-q}^{q} c_k HR_k,$$

wherein $P1_{(i,j)}$ represents subpixel data located in a coordinate (i,j) in the first adjusted image signal, q is an integer, $HR_0$ represents the corresponding subpixel data in the original image signal, $HR_{-q}$ to $HR_{-1}$ and $HR_1$ to $HR_q$ represent a plurality of subpixel data adjacent to the corresponding subpixel data $HR_0$ of the original image signal in a direction, and $c_k$ represents a filter value corresponding to subpixel data $HR_k$ in the original image signal.

3. The image downsampling apparatus according to claim 1, wherein the multi-directional downsampling circuit selects one corresponding subpixel data from a plurality of subpixel data of the original image signal and calculates $$P2_{(i,j)} = \sum_{k1=-q}^{q} \sum_{k2=-q}^{q} c_{(k1,k2)} HR_{(k1,k2)},$$

wherein $P2_{(i,j)}$ represents subpixel data located in a coordinate (i,j) in the second adjusted image signal, q is an integer, $HR_{(0,0)}$ represents the corresponding subpixel data in the original image signal, the rest of $HR_{(k1,k2)}$ represent the plurality of subpixel data adjacent to the corresponding subpixel data $HR_{(0,0)}$ in the original image signal, and $c_{(k1,k2)}$ represents a filter value corresponding to each subpixel data $HR_{(k1,k2)}$ in the original image signal.

4. The image downsampling apparatus according to claim 1, wherein the output circuit comprises:
   a colorless detector, receiving the original image signal and performing colorless detection by using the original image signal to obtain and output a detection result; and
   a multiplexer, having a first input terminal coupled to the output terminal of the one-directional downsampling circuit, a second input terminal coupled to the output terminal of the multi-directional downsampling circuit, a control terminal coupled to an output terminal of the colorless detector to receive the detection result, and an output terminal outputting the downsampled image signal.

5. The image downsampling apparatus according to claim 4, wherein the colorless detector calculates $$m_T = \sum_{k1} \sum_{k2} (|R_{(a*i+k1,a*j+k2)} - G_{(a*i+k1,a*j+k2)}| +$$

$$|R_{(a*i+k1,a*j+k2)} - B_{(a*i+k1,a*j+k2)}| +$$

$$|G_{(a*i+k1,a*j+k2)} - B_{(a*i+k1,a*j+k2)}|),$$

wherein a is a positive integer, $R_{(a*i+k1,a*j+k2)}$ represents red-color data of a corresponding pixel in the original image signal, and $G_{(a*i+k1,a*j+k2)}$ represents green-color data of the corresponding pixel in the original image signal, $B_{(a*i+k1,a*j+k2)}$ represents blue-color data of the corresponding pixel in the original image signal, and wherein when $m_T$ is less than or equal to a threshold, the colorless detector sets the detection result as a first logic value, and when $m_T$ is greater than the threshold, the colorless detector sets the detection result as a second logic value.

6. The image downsampling apparatus according to claim 4, wherein the one-directional downsampling circuit and the multi-directional downsampling circuit are further coupled to the output terminal of the colorless detector to receive the detection result, when the detection result is a first logic value, the one-directional downsampling circuit performs the one-directional downsampling according to red-color data $R_{(a*i,a*j)}$, green-color data $G_{(a*i,a*j)}$ and blue-color data $B_{(a*i,a*j)}$ of a corresponding pixel in the original image signal to obtain red-color subpixel data, green-color subpixel data and blue-color subpixel data of a pixel located in a coordinate (i,j) in the first adjusted image signal, wherein a is a positive integer, when the detection result is the first logic value, the multi-directional downsampling circuit performs the multi-directional downsampling according to the red-color data $R_{(a*i,a*j)}$, the green-color data $G_{(a*i,a*j)}$ and the blue-color data $B_{(a*i,a*j)}$ of the corresponding pixel in the original image signal to obtain red-color subpixel data, green-color subpixel data and blue-color subpixel data located in the pixel coordinate (i,j) in the second adjusted image signal, when the detection result is a second logic value, the one-directional downsampling circuit selects red-color data of a first corresponding pixel, green-color data of a second corresponding pixel and blue-color data of a third corresponding pixel from the original image signal in a sampling direction to perform the one-directional downsampling according to obtain the red-color subpixel data, the green-color subpixel data and the blue-color subpixel data located in the pixel coordinate (i,j) in the first adjusted image signal, wherein one of the first corresponding pixel, the second corresponding pixel and the third corresponding pixel has a pixel coordinate (a*i,a*j) in the original image signal, and when the detection result is the second logic value, the multi-directional downsampling circuit selects the red-color data of the first corresponding pixel, the green-color data of the second corresponding pixel and the blue-color data of the third corresponding pixel from the original image signal in the sampling direction to perform the multi-directional downsampling to obtain the red-color subpixel data, the green-color subpixel data and the blue-color subpixel data located in the pixel coordinate (i,j) in the second adjusted image signal.

7. The image downsampling apparatus according to claim 1, wherein the output circuit comprises:

a colorless detector, receiving the original image signal and performing colorless detection by using the original image signal to obtain and output a detection result; and a blending circuit, having a first input terminal coupled to the output terminal of the one-directional downsampling circuit, a second input terminal coupled to the output terminal of the multi-directional downsampling circuit, a control terminal coupled to an output terminal of the colorless detector to receive the detection result, and an output terminal outputting the downsampled image signal, wherein the blending circuit determines a weight of the first adjusted image signal and a weight of the second adjusted image signal in the downsampled image signal according to the detection result.

8. The image downsampling apparatus according to claim 1, wherein the output circuit comprises:

a weight calculation circuit, receiving the original image signal and calculating the weight value by using the original image signal; and a blending circuit, having a first input terminal coupled to the output terminal of the one-directional downsampling circuit, a second input terminal coupled to the output terminal of the multi-directional downsampling circuit, a control terminal coupled to an output terminal of the weight calculation circuit to receive the weight value, and an output terminal outputting the downsampled image signal, wherein the blending circuit determines a component ratio of the first adjusted image signal to the second adjusted image signal in the downsampled image signal according to the weight value.

9. The image downsampling apparatus according to claim 8, wherein the weight calculation circuit performs a Gaussian filter operation on the original image signal to obtain a plurality of first weights corresponding to different pixel positions, converts the plurality of first weights into a plurality of second weights according to a conversion curve, and obtains the weight value according to at least one of the plurality of second weights.

10. The image downsampling apparatus according to claim 9, wherein the weight calculation circuit calculates $$W_{(x,y)} = \frac{1}{\sigma^2}\left(\frac{x^2+y^2}{\sigma^2} - 2\right)e^{\frac{-(x^2+y^2)}{2\sigma^2}} * HR_{(x,y)},$$

wherein $W_{(x,y)}$ is a first weight corresponding to a pixel coordinate (x,y), σ is a real number, and $HR_{(x,y)}$ represents pixel data of the pixel coordinate (x,y) in the original image signal.

11. The image downsampling apparatus according to claim 1, further comprising:

a colorless detector, receiving the original image signal and performing colorless detection by using the original image signal to obtain and output a detection result to the one-directional downsampling circuit and the multi-directional downsampling circuit, wherein when the detection result is a first logic value, the one-directional downsampling circuit performs the one-directional downsampling according to red-color data $R_{(a*i,a*j)}$, green-color data $G_{(a*i,a*j)}$ and blue-color data $B_{(a*i,a*j)}$ of a corresponding pixel in the original image signal to obtain red-color subpixel data, green-color subpixel data and blue-color subpixel data located in a pixel coordinate (i,j) in the first adjusted image signal, wherein a is a positive integer, when the detection result is the first logic value, the multi-directional downsampling circuit performs the multi-directional downsampling according to the red-color data $R_{(a*i,a*j)}$, the green-color data $G_{(a*i,a*j)}$ and the blue-color data $B_{(a*i,a*j)}$ of the corresponding pixel in the original image signal to obtain red-color subpixel data, green-color subpixel data and blue-color subpixel data located in the pixel coordinate (i,j) in the second adjusted image signal, when the detection result is a second logic value, the one-directional downsampling circuit selects red-color data of a first corresponding pixel, green-color data of a second corresponding pixel and blue-color data of a third corresponding pixel from the original image signal in a sampling direction to perform the one-directional downsampling to obtain the red-color subpixel data, the green-color subpixel data and the blue-color subpixel data located in the pixel coordinate (i,j) in the first adjusted image signal, wherein one of the first corresponding pixel, the second corresponding pixel and the third corresponding pixel has a pixel coordinate (a*i,a*j) in the original image signal, and when the detection result is the second logic value, the multi-directional downsampling circuit selects the red-color data of the first corresponding pixel, the green-color data of the second corresponding pixel and the blue-color data of the third corresponding pixel from the original image signal in the sampling direction to perform the multi-directional downsampling to obtain the red-color subpixel data, the green-color subpixel data and the blue-color subpixel data located in the pixel coordinate (i,j) in the second adjusted image signal.

12. The image downsampling apparatus according to claim 11, further comprising:
a direction detection circuit, receiving the original image signal and performing direction detection by using the original image signal to obtain and output direction information to the one-directional downsampling circuit and the multi-directional downsampling circuit,
wherein the direction information controls and determines the sampling direction of the one-directional downsampling circuit and the multi-directional downsampling circuit.

13. The image downsampling apparatus according to claim 11, further comprising:
a color space conversion circuit, receiving the original image signal and converting the original image signal into a luminance signal; and
a direction detection circuit, coupled to the color space conversion circuit to receive the luminance signal and performing direction detection by using the luminance signal to obtain and output direction information to the one-directional downsampling circuit and the multi-directional downsampling circuit,
wherein the direction information controls and determines the sampling direction of the one-directional downsampling circuit and the multi-directional downsampling circuit.

14. The image downsampling apparatus according to claim 13, wherein the direction detection circuit calculates a difference value between each adjacent pixels in different directions and determines the direction information according to the difference values between the adjacent pixels.

15. The image downsampling apparatus according to claim 1, wherein the output circuit comprises:
a color space conversion circuit, receiving the original image signal and converting the original image signal into a luminance signal;
a weight calculation circuit, coupled to the color space conversion circuit to receive the luminance signal and calculating a weight value by using the luminance signal; and a blending circuit, having a first input terminal coupled to the output terminal of the one-directional downsampling circuit, a second input terminal coupled to the output terminal of the multi-directional downsampling circuit, a control terminal coupled to an output terminal of the weight calculation circuit to receive the weight value, and an output terminal outputting the downsampled image signal, wherein the blending circuit determines a component ratio of the first adjusted image signal to the second adjusted image signal in the downsampled image signal according to the weight value.

16. The image downsampling apparatus according to claim 15, wherein the weight calculation circuit performs a Gaussian filter operation on the luminance signal to obtain a plurality of first weights corresponding to different pixel positions, converts the plurality of first weights into a plurality of second weights according to a conversion curve, and obtains the weight value according to at least one of the plurality of second weights.

17. The image downsampling apparatus according to claim 16, wherein the weight calculation circuit calculates $$W_{(x,y)} = \frac{1}{\sigma^2}\left(\frac{x^2+y^2}{\sigma^2} - 2\right)e^{\frac{-(x^2+y^2)}{2\sigma^2}} * HR_{(x,y)},$$

wherein $W_{(x,y)}$ is a first weight corresponding to a pixel coordinate (x,y), $\sigma$ is a real number, and $Y_{(x,y)}$ represents luminance data of the pixel coordinate (x,y) in the luminance signal.

18. An image downsampling method, comprising:
performing one-direction downsampling by using an original image signal to obtain a first adjusted image signal, wherein a resolution of the first adjusted image signal is less than a resolution of the original image signal;
performing multi-direction downsampling by using the original image signal to obtain a second adjusted image signal, wherein a resolution of the second adjusted image signal is less than the resolution of the original image signal; and
obtaining a downsampled image signal according to the first adjusted image signal and the second adjusted image signal by calculating data of each pixel of one or more pixels of the downsampled image signal as a mixed value of both data of one corresponding pixel at the same position of the first adjusted image signal and data of one corresponding pixel at the same position of the second adjusted image signal.

19. An image downsampling apparatus, comprising:
a colorless detector, receiving an original image signal and performing colorless detection by using the original image signal to obtain and output a detection result; and
a downsampling circuit, receiving the original image signal and performing downsampling by using the original image signal to obtain and output an downsampled image signal, wherein a resolution of the downsampled image signal is less than a resolution of the original image signal, wherein
when the detection result is a first logic value, the downsampling circuit performs the downsampling according to red-color data $R_{(a*i,a*j)}$, green-color data $G_{(a*i,a*j)}$ and blue-color data $B_{(a*i,a*j)}$ of a corresponding pixel in the original image signal to obtain red-color subpixel data, green-color subpixel data and blue-color subpixel data located in a pixel coordinate (i,j) in the downsampled image signal, wherein a is a positive integer, and when the detection result is a second logic value, the downsampling circuit selects red-color data of a first corresponding pixel, green-color data of a second corresponding pixel and blue-color data of a third corresponding pixel from the original image signal in a sampling direction to perform the downsampling to obtain the red-color subpixel data, the green-color subpixel data and the blue-color subpixel data of the pixel coordinate (i,j) in the downsampled image signal, wherein one of the first corresponding pixel, the second corresponding pixel and the third corresponding pixel has a pixel coordinate (a*i,a*j) in the original image signal.

20. The image downsampling apparatus according to claim 19, wherein the downsampling circuit comprises:
a one-directional downsampling circuit, receiving the original image signal and performing one-directional downsampling by using the original image signal to obtain and output the downsampled image signal; or
a multi-directional downsampling circuit, receiving the original image signal and performing multi-directional downsampling by using the original image signal to obtain and output the downsampled image signal.

21. The image downsampling apparatus according to claim 19, wherein the downsampling circuit comprises:
a one-directional downsampling circuit, receiving the original image signal and performing one-direction downsampling by using the original image signal to obtain and output a first adjusted image signal, wherein a resolution of the first adjusted image signal is less than the resolution of the original image signal;
a multi-directional downsampling circuit, receiving the original image signal and performing multi-direction downsampling by using the original image signal to obtain and output a second adjusted image signal, wherein a resolution of the second adjusted image signal is less than the resolution of the original image signal; and
a multiplexer, having a first input terminal coupled to an output terminal of the one-directional downsampling circuit, a second input terminal coupled to an output terminal of the multi-directional downsampling circuit, a control terminal coupled to an output terminal of the colorless detector to receive the detection result, and an output terminal outputting the downsampled image signal.

22. The image downsampling apparatus according to claim 21, wherein the one-directional downsampling circuit selects one corresponding subpixel data from a plurality of subpixel data of the original image signal and calculates $$P1_{(i,j)} = \sum_{k=-q}^{q} c_k HR_k,$$

wherein $P1_{(i,j)}$ represents subpixel data located in a coordinate (i,j) in the first adjusted image signal, q is an integer, $HR_0$ represents the corresponding subpixel data in the original image signal, $HR_{-q}$ to $HR_{-1}$ and $HR_1$ to $HR_q$ represent a plurality of subpixel data adjacent to the corresponding subpixel data $HR_0$ in the original image signal in a direction, and $c_k$ represents a filter value corresponding to subpixel data $HR_k$ in the original image signal.

23. The image downsampling apparatus according to claim 21, wherein the multi-directional downsampling circuit selects one corresponding subpixel data from a plurality of subpixel data of the original image signal and calculates $$P2_{(i,j)} = \sum_{k1=-q}^{q} \sum_{k2=-q}^{q} c_{(k1,k2)} HR_{(k1,k2)},$$

wherein $P2_{(i,j)}$ represents subpixel data located in a coordinate (i,j) in the second adjusted image signal, q is an integer, $HR(0,0)$ represents the corresponding subpixel data in the original image signal, the rest of $HR_{(k1,k2)}$ represent the plurality of subpixel data adjacent to the corresponding subpixel data $HR_{(0,0)}$ in the original image signal, and $c_{(k1,k2)}$ represents a filter value corresponding to each subpixel data $HR_{(k1,k2)}$ in the original image signal.

24. The image downsampling apparatus according to claim 21, wherein the one-directional downsampling circuit and the multi-directional downsampling circuit are further coupled to an output terminal of the colorless detector to receive the detection result, wherein
when the detection result is the first logic value, the one-directional downsampling circuit performs the one-directional downsampling according to the red-color data $R_{(a*i,a*j)}$, the green-color data $G_{(a*i,a*j)}$ and the blue-color data $B_{(a*i,a*j)}$ of the corresponding pixel in the original image signal to obtain red-color subpixel data, green-color subpixel data and blue-color subpixel data located in the pixel coordinate (i,j) in the first adjusted image signal,
when the detection result is the first logic value, the multi-directional downsampling circuit performs the multi-directional downsampling according to the red-color data $R_{(a*i,a*j)}$, the green-color data $G_{(a*i,a*j)}$ and the blue-color data $B_{(a*i,a*j)}$ of the corresponding pixel in the original image signal to obtain red-color subpixel data, green-color subpixel data and blue-color subpixel data located in the pixel coordinate (i,j) in the second adjusted image signal,
when the detection result is the second logic value, the one-directional downsampling circuit selects the red-color data of the first corresponding pixel, the green-color data of the second corresponding pixel and the blue-color data of the third corresponding pixel from the original image signal in the sampling direction to performs the one-directional downsampling to obtain the red-color subpixel data, the green-color subpixel data and the blue-color subpixel data located in the pixel coordinate (i,j) in the first adjusted image signal, and
when the detection result is the second logic value, the multi-directional downsampling circuit selects the red-color data of the first corresponding pixel, the green-color data of the second corresponding pixel and the blue-color data of the third corresponding pixel from the original image signal in the sampling direction to perform the multi-directional downsampling to obtain the red-color subpixel data, the green-color subpixel data and the blue-color subpixel data located in the pixel coordinate (i,j) in the second adjusted image signal.

25. The image downsampling apparatus according to claim 19, wherein the colorless detector calculates $$m_T = \sum_{k1}\sum_{k2} (|R_{(a*i+k1,a*j+k2)} - G_{(a*i+k1,a*j+k2)}| +$$
$$|R_{(a*i+k1,a*j+k2)} - B_{(a*i+k1,a*j+k2)}| +$$
$$|G_{(a*i+k1,a*j+k2)} - B_{(a*i+k1,a*j+k2)}|),$$

wherein a is a positive integer, $R_{(a*i+k1,a*j+k2)}$ represents red-color data of a pixel in the original image signal, $G_{(a*i+k1,a*j+k2)}$ represents green-color data of the pixel in the original image signal, $B_{(a*i+k1,a*j+k2)}$ represents blue-color data of the pixel in the original image signal, wherein
  when $m_T$ is less than or equal to a threshold, the colorless detector sets the detection result as the first logic value, and
  when $m_T$ is greater than the threshold, the colorless detector sets the detection result as the second logic value.

26. The image downsampling apparatus according to claim 19, wherein the downsampling circuit comprises:
  a one-directional downsampling circuit, receiving the original image signal and performing one-direction downsampling by using the original image signal to obtain and output a first adjusted image signal, wherein a resolution of the first adjusted image signal is less than the resolution of the original image signal;
  a multi-directional downsampling circuit, receiving the original image signal and performing multi-direction downsampling by using the original image signal to obtain and output a second adjusted image signal, wherein a resolution of the second adjusted image signal is less than the resolution of the original image signal; and
  a blending circuit, having a first input terminal coupled to an output terminal of the one-directional downsampling circuit, a second input terminal coupled to an output terminal of the multi-directional downsampling circuit, a control terminal coupled to an output terminal of the colorless detector to receive the detection result, and an output terminal outputting the downsampled image signal, wherein the blending circuit determines a weight of the first adjusted image signal and a weight of the second adjusted image signal in the downsampled image signal according to the detection result.

27. The image downsampling apparatus according to claim 19, wherein the downsampling circuit comprises:
  a one-directional downsampling circuit, receiving the original image signal and performing one-direction downsampling by using the original image signal to obtain and output a first adjusted image signal, wherein a resolution of the first adjusted image signal is less than the resolution of the original image signal;
  a multi-directional downsampling circuit, receiving the original image signal and performing multi-direction downsampling by using the original image signal to obtain and output a second adjusted image signal, wherein a resolution of the second adjusted image signal is less than the resolution of the original image signal;
  a weight calculation circuit, receiving the original image signal and calculating a weight value by using the original image signal; and
  a blending circuit, having a first input terminal coupled to an output terminal of the one-directional downsampling circuit, a second input terminal coupled to an output terminal of the multi-directional downsampling circuit, a control terminal coupled to an output terminal of the weight calculation circuit to receive the weight value, and an output terminal outputting the downsampled image signal, wherein the blending circuit determines a component ratio of the first adjusted image signal to the second adjusted image signal in the downsampled image signal according to the weight value.

28. The image downsampling apparatus according to claim 27, wherein the weight calculation circuit performs a Gaussian filter operation on the original image signal to obtain a plurality of first weights corresponding to different pixel positions, converts the plurality of first weights into a plurality of second weights according to a conversion curve and obtains the weight value according to at least one of the plurality of second weights.

29. The image downsampling apparatus according to claim 28, wherein the weight calculation circuit calculates $$W_{(x,y)} = \frac{1}{\sigma^2}\left(\frac{x^2+y^2}{\sigma^2} - 2\right)e^{\frac{-(x^2+y^2)}{2\sigma^2}} * HR_{(x,y)},$$

wherein $W_{(x,y)}$ is a first weight corresponding to the pixel coordinate (x,y), σ is a real number, and $HR_{(x,y)}$ represents pixel data of the pixel coordinate (x,y) in the original image signal.

30. The image downsampling apparatus according to claim 27, wherein the blending circuit calculates LR=α*P2+ (1−α)*P1,
  wherein LR is the downsampled image signal, a is the weight value, P1 is the first adjusted image signal, and P2 is the second adjusted image signal.

31. The image downsampling apparatus according to claim 19, further comprising:
  a direction detection circuit, receiving the original image signal and performing direction detection by using the original image signal to obtain and output direction information to the downsampling circuit,
  wherein the direction information controls and determines the sampling direction of the downsampling circuit.

32. The image downsampling apparatus according to claim 19, wherein the downsampling circuit comprises:
  a one-directional downsampling circuit, receiving the original image signal and performing one-direction downsampling by using the original image signal to obtain and output a first adjusted image signal, wherein a resolution of the first adjusted image signal is less than the resolution of the original image signal;
  a multi-directional downsampling circuit, receiving the original image signal and performing multi-direction downsampling by using the original image signal to obtain and output a second adjusted image signal, wherein a resolution of the second adjusted image signal is less than the resolution of the original image signal;
  a color space conversion circuit, receiving the original image signal and converting the original image signal into a luminance signal;

a weight calculation circuit, coupled to the color space conversion circuit to receive the luminance signal and calculating a weight value by using the luminance signal; and a blending circuit, having a first input terminal coupled to an output terminal of the one-directional downsampling circuit, a second input terminal coupled to an output terminal of the multi-directional downsampling circuit, a control terminal coupled to an output terminal of the weight calculation circuit to receive the weight value, and an output terminal outputting the downsampled image signal, wherein the blending circuit determines a component ratio of the first adjusted image signal to the second adjusted image signal in the downsampled image signal according to the weight value.

33. The image downsampling apparatus according to claim 19, further comprising:

a color space conversion circuit, receiving the original image signal and converting the original image signal into a luminance signal; and a direction detection circuit, coupled to the color space conversion circuit to receive the luminance signal and performing direction detection by using the luminance signal to obtain and output direction information to the downsampling circuit, wherein the direction information controls and determines the sampling direction of the downsampling circuit.

34. The image downsampling apparatus according to claim 33, wherein the direction detection circuit calculates a difference value between each adjacent pixels in different directions and determines the direction information according to the difference values between the adjacent pixels.

35. The image downsampling apparatus according to claim 33, wherein the downsampling circuit comprises:

a one-directional downsampling circuit, receiving the original image signal and performing one-direction downsampling by using the original image signal to obtain and output a first adjusted image signal, wherein a resolution of the first adjusted image signal is less than the resolution of the original image signal;

a multi-directional downsampling circuit, receiving the original image signal and performing multi-direction downsampling by using the original image signal to obtain and output a second adjusted image signal, wherein a resolution of the second adjusted image signal is less than the resolution of the original image signal;

a weight calculation circuit, coupled to the color space conversion circuit to receive the luminance signal and configured to calculate a weight value by using the luminance signal; and a blending circuit, having a first input terminal coupled to an output terminal of the one-directional downsampling circuit, a second input terminal coupled to an output terminal of the multi-directional downsampling circuit, a control terminal coupled to an output terminal of the weight calculation circuit to receive the weight value, and an output terminal outputting the downsampled image signal, wherein the blending circuit determines a component ratio of the first adjusted image signal to the second adjusted image signal in the downsampled image signal according to the weight value.

36. The image downsampling apparatus according to claim 35, wherein the weight calculation circuit performs a Gaussian filter operation on the luminance signal to obtain a plurality of first weights corresponding to different pixel positions, converts the plurality of first weights into a plurality of second weights according to a conversion curve and obtains the weight value according to at least one of the plurality of second weights.

37. The image downsampling apparatus according to claim 36, wherein the weight calculation circuit calculates $$W_{(x,y)} = \frac{1}{\sigma^2}\left(\frac{x^2+y^2}{\sigma^2} - 2\right)e^{\frac{-(x^2+y^2)}{2\sigma^2}} * Y_{(x,y)},$$

wherein $W_{(x,y)}$ is a first weight corresponding to a pixel coordinate (x,y), σ is a real number, and $Y_{(x,y)}$ represents luminance data of the pixel coordinate (x,y) in the luminance signal.

38. An image downsampling method, comprising:

performing colorless detection by using an original image signal to obtain a detection result; and performing downsampling by using the original image signal to obtain a downsampled image signal, wherein a resolution of the downsampled image signal is less than a resolution of the original image signal;

when the detection result is a first logic value, performing the downsampling according to red-color data $R_{(a*i,a*j)}$, green-color data $G_{(a*i,a*j)}$ and blue-color data $B_{(a*i,a*j)}$ of a corresponding pixel in the original image signal to obtain red-color subpixel data, green-color subpixel data and blue-color subpixel data located in a pixel coordinate (i,j) in the downsampled image signal, wherein a is a positive integer; and when the detection result is a second logic value, selecting red-color data of a first corresponding pixel, green-color data of a second corresponding pixel and blue-color data of a third corresponding pixel from the original image signal in a sampling direction to perform the downsampling to obtain the red-color subpixel data, the green-color subpixel data and the blue-color subpixel data of the pixel coordinate (i,j) in the downsampled image signal, wherein one of the first corresponding pixel, the second corresponding pixel and the third corresponding pixel has a pixel coordinate (a*i, a*j) in the original image signal.

39. The image downsampling apparatus according to claim 1, wherein the output circuit determines one of the first adjusted image signal and the second adjusted image signal to be contained in the downsampled image signal.

40. The image downsampling apparatus according to claim 39, wherein the output circuit makes the determination according to characteristics of the original image signal or the downsampled image signal.

41. The image downsampling apparatus according to claim 1, wherein the output circuit makes the determination of the weight value α according to characteristics of the original image signal or the downsampled image signal.

42. The image downsampling method according to claim 18, wherein the step of obtaining a downsampled image signal according to the first adjusted image signal and the second adjusted image signal comprises:

determining one of the first adjusted image signal and the second adjusted image signal to be contained in the downsampled image signal.

43. The image downsampling method according to claim 42, wherein the determination is made according to characteristics of the original image signal or the downsampled image signal.

44. An image downsampling apparatus, comprising:
a one-directional downsampling circuit, receiving an original image signal and performing one-direction downsampling by using the original image signal to obtain and output a first adjusted image signal, wherein a resolution of the first adjusted image signal is less than a resolution of the original image signal;
a multi-directional downsampling circuit, receiving the original image signal and performing multi-direction downsampling by using the original image signal to obtain and output a second adjusted image signal, wherein a resolution of the second adjusted image signal is less than the resolution of the original image signal; and
an output circuit, coupled to an output terminal of the one-directional downsampling circuit and an output terminal of the multi-directional downsampling circuit, wherein the output circuit outputs a downsampled image signal according to the first adjusted image signal and the second adjusted image signal, wherein the output circuit comprises:
a multiplexer, having a first input terminal coupled to the output terminal of the one-directional downsampling circuit, a second input terminal coupled to the output terminal of the multi-directional downsampling circuit, a control terminal coupled to receive a detection result, and an output terminal outputting the downsampled image signal; and
a colorless detector, receiving the original image signal and performing colorless detection by using the original image signal to obtain and output the detection result.

45. An image downsampling method, comprising:
performing one-direction downsampling by using an original 2D image signal to obtain a first adjusted 2D image signal, wherein a resolution of the first adjusted 2D image signal is less than a resolution of the original 2D image signal;
performing multi-direction downsampling by using the original 2D image signal to obtain a second adjusted 2D image signal, wherein a resolution of the second adjusted 2D image signal is less than the resolution of the original 2D image signal; and
obtaining and outputting a downsampled 2D image signal according to the first adjusted 2D image signal and the second adjusted 2D image signal
by calculating data of each pixel of one or more pixels of the downsampled image signal as a mixed value of both data of one corresponding pixel at the same position of the first adjusted image signal and data of one corresponding pixel at the same position of the second adjusted image signal.

46. The image downsampling method according to claim 45, wherein the obtaining and outputting step comprises:
selectively outputting the first adjusted 2D image signal or the second adjusted 2D image signal as the downsampled 2D image signal.

47. The image downsampling method according to claim 45, wherein the obtaining and outputting step comprises:
selectively outputting the first adjusted 2D image signal or the second adjusted 2D image signal or a blending result of the first adjusted 2D image signal and the second adjusted 2D image signal as the downsampled 2D image signal.

48. The image downsampling apparatus according to claim 1, wherein the downsampled image signal is calculated by using a formula, $LR=\alpha*P2+(1-\alpha)*P1$, wherein LR denotes data of each pixel of one or more pixels of the downsampled image signal, P1 denotes data of each corresponding pixel of the first adjusted image signal, and P2 denotes data of each corresponding pixel of the second adjusted image signal, wherein $\alpha$ is determined to be a weight value which is greater than 0 and smaller than 1.

49. The image downsampling method according to claim 18, wherein the downsampled image signal is calculated by using a formula, $LR=\alpha*P2+(1-\alpha)*P1$, wherein LR denotes data of each pixel of one or more pixels of the downsampled image signal, P1 denotes data of each corresponding pixel of the first adjusted image signal, and P2 denotes data of each corresponding pixel of the second adjusted image signal, wherein $\alpha$ is determined to be a weight value which is greater than 0 and smaller than 1.

50. The image downsampling method according to claim 45, wherein the downsampled image signal is calculated by using a formula, $LR=\alpha*P2+(1-\alpha)*P1$, wherein LR denotes data of each pixel of one or more pixels of the downsampled image signal, P1 denotes data of each corresponding pixel of the first adjusted image signal, and P2 denotes data of each corresponding pixel of the second adjusted image signal, wherein $\alpha$ is determined to be a weight value which is greater than 0 and smaller than 1.

51. The image downsampling method according to claim 49, wherein the determination of the weight value $\alpha$ is made according to characteristics of the original image signal or the downsampled image signal.

\* \* \* \* \*